US012662786B2

(12) United States Patent
Muppidi et al.

(10) Patent No.: US 12,662,786 B2
(45) Date of Patent: Jun. 23, 2026

(54) AI-BASED AUTONOMOUS SYSTEM AND METHOD FOR PREDICTING AND REMOVING FLOATING WASTE FROM WATER BODIES

(71) Applicants:Preetam Sai Muppidi, San Ramon, CA (US); Madhumati Pattabhi, Kingsville, TX (US)

(72) Inventors: Preetam Sai Muppidi, San Ramon, CA (US); Madhumati Pattabhi, Kingsville, TX (US); Sudhakar Rao Krothapalli, Rancho Palos Verdes, CA (US)

( * ) Notice: Subject to any disclaimer, the term of this patent is extended or adjusted under 35 U.S.C. 154(b) by 0 days.

(21) Appl. No.: 19/411,416

(22) Filed: Dec. 8, 2025

(65) Prior Publication Data

US 2026/0092421 A1 Apr. 2, 2026

Related U.S. Application Data

(60) Provisional application No. 63/769,800, filed on Mar. 11, 2025.

(51) Int. Cl.
| | |
|---|---|
| *E02B 15/10* | (2006.01) |
| *B63B 35/32* | (2006.01) |

(Continued)

(52) U.S. Cl.
CPC ............ *E02B 15/104* (2013.01); *B63B 35/32* (2013.01); *B63B 79/15* (2020.01); *B63B 79/20* (2020.01);

(Continued)

(58) Field of Classification Search
CPC ...... C02F 1/008; C02F 1/40; C02F 2103/007; C02F 2209/006; C02F 2209/05;

(Continued)

(56) References Cited

U.S. PATENT DOCUMENTS

2007/0111275 A1* 5/2007 Vincent ................. G01N 33/18
702/19

FOREIGN PATENT DOCUMENTS

| CN | 110228875 A | * 9/2019 | ............. B63B 35/32 |
|---|---|---|---|
| CN | 119324004 A | * 1/2025 | ......... G06F 18/2431 |
| CN | 119418192 A | * 2/2025 | ............. G06V 10/20 |

OTHER PUBLICATIONS

CN 110228875 A English description, Sep. 13, 2019, Wang Hua et al.*

(Continued)

*Primary Examiner* — Akash K Varma

(74) *Attorney, Agent, or Firm* — NOVEL PATENT SERVICES LLC

(57) ABSTRACT

An artificial intelligence (AI)-based autonomous system integrated with an autonomous water-cleaning vehicle that predicts and selectively removes floating waste by accurately analyzing algae type, volume, and vitality, thereby ensuring targeted removal to maintain ecological balance and enhance water quality in water bodies. The AI-based autonomous system comprises a computing device, an autonomous water-cleaning vehicle, a network, a server, a database, and a user device. The autonomous water-cleaning vehicle comprises a floating body, a plurality of propelling wheels, one or more motors, a primary supporter, a secondary supporter, a first extended column, a second extended column, a supporting frame, a driving unit, a first roller, a second roller, an inclined conveyor belt, a counterweight, a container, an AI imaging unit, a water-salinity sensor, the optical fluorescence-sensing unit, a navigation unit, and a controller.

15 Claims, 8 Drawing Sheets

(51) Int. Cl.

| | |
|---|---|
| *B63B 79/15* | (2020.01) |
| *B63B 79/20* | (2020.01) |
| *B63B 79/40* | (2020.01) |
| *C02F 1/00* | (2023.01) |
| *C02F 1/40* | (2023.01) |
| *G06V 10/12* | (2022.01) |
| *G06V 10/764* | (2022.01) |
| *G06V 20/56* | (2022.01) |
| *C02F 103/00* | (2006.01) |
| *G06V 10/762* | (2022.01) |

(52) U.S. Cl.
CPC .............. *B63B 79/40* (2020.01); *C02F 1/008* (2013.01); *C02F 1/40* (2013.01); *G06V 10/12* (2022.01); *G06V 10/764* (2022.01); *G06V 20/56* (2022.01); *C02F 2103/007* (2013.01); *C02F 2209/006* (2013.01); *C02F 2209/05* (2013.01); *G06V 10/762* (2022.01)

(58) Field of Classification Search
CPC ......... B63B 79/15; B63B 79/40; B63B 79/20; B63B 35/32; E02B 15/104; G06V 10/12; G06V 10/764; G06V 10/762
USPC ......................................................... 210/745
See application file for complete search history.

(56) References Cited

OTHER PUBLICATIONS

CN 119418192 A English description, Feb. 11, 2025, Sun Beili et al.*
CN 119324004 A English description, Jan. 17, 2025, Tang Weihao.*

* cited by examiner

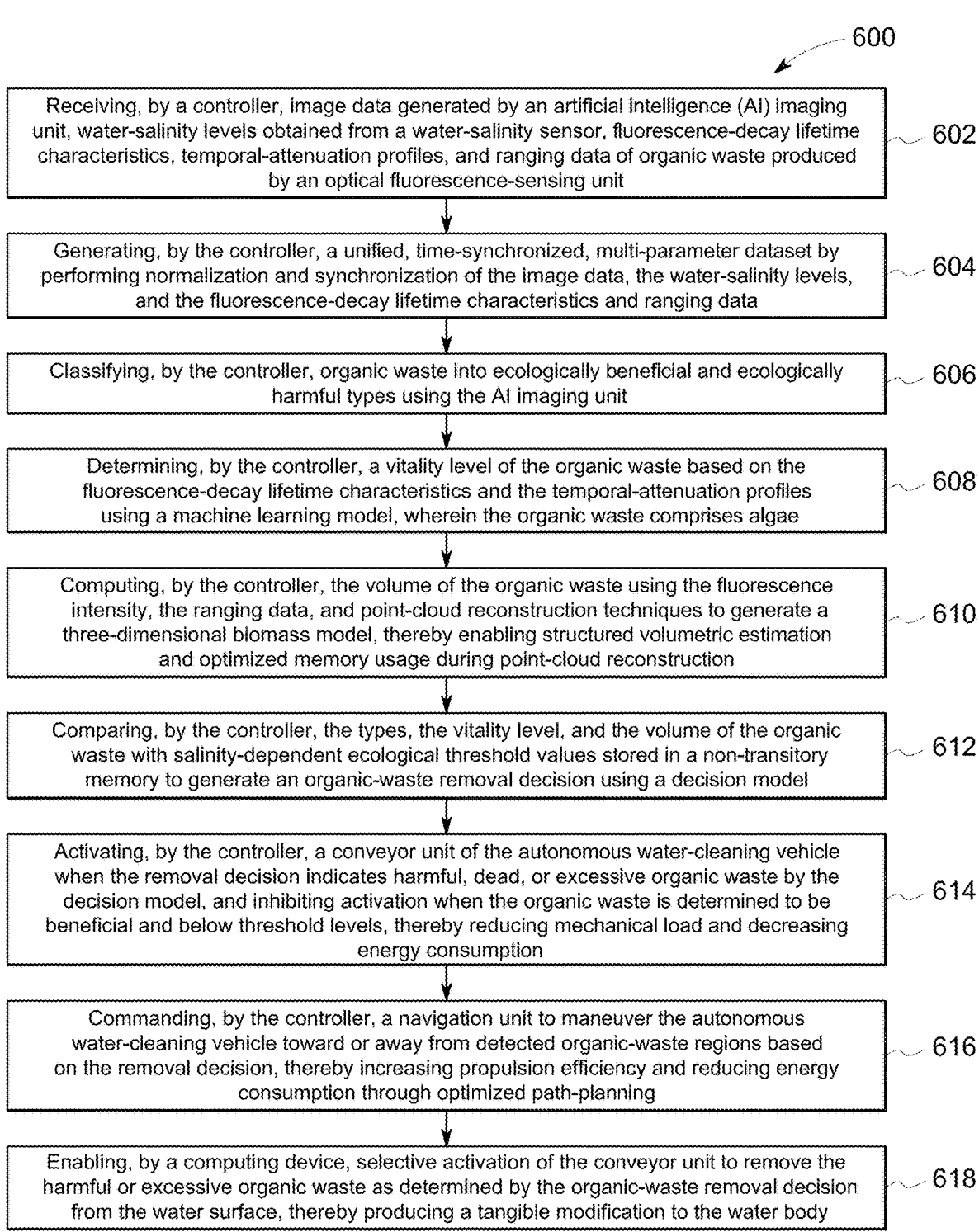

600

Receiving, by a controller, image data generated by an artificial intelligence (AI) imaging unit, water-salinity levels obtained from a water-salinity sensor, fluorescence-decay lifetime characteristics, temporal-attenuation profiles, and ranging data of organic waste produced by an optical fluorescence-sensing unit ～602

Generating, by the controller, a unified, time-synchronized, multi-parameter dataset by performing normalization and synchronization of the image data, the water-salinity levels, and the fluorescence-decay lifetime characteristics and ranging data ～604

Classifying, by the controller, organic waste into ecologically beneficial and ecologically harmful types using the AI imaging unit ～606

Determining, by the controller, a vitality level of the organic waste based on the fluorescence-decay lifetime characteristics and the temporal-attenuation profiles using a machine learning model, wherein the organic waste comprises algae ～608

Computing, by the controller, the volume of the organic waste using the fluorescence intensity, the ranging data, and point-cloud reconstruction techniques to generate a three-dimensional biomass model, thereby enabling structured volumetric estimation and optimized memory usage during point-cloud reconstruction ～610

Comparing, by the controller, the types, the vitality level, and the volume of the organic waste with salinity-dependent ecological threshold values stored in a non-transitory memory to generate an organic-waste removal decision using a decision model ～612

Activating, by the controller, a conveyor unit of the autonomous water-cleaning vehicle when the removal decision indicates harmful, dead, or excessive organic waste by the decision model, and inhibiting activation when the organic waste is determined to be beneficial and below threshold levels, thereby reducing mechanical load and decreasing energy consumption ～614

Commanding, by the controller, a navigation unit to maneuver the autonomous water-cleaning vehicle toward or away from detected organic-waste regions based on the removal decision, thereby increasing propulsion efficiency and reducing energy consumption through optimized path-planning ～616

Enabling, by a computing device, selective activation of the conveyor unit to remove the harmful or excessive organic waste as determined by the organic-waste removal decision from the water surface, thereby producing a tangible modification to the water body ～618

FIG. 6

AI-BASED AUTONOMOUS SYSTEM AND METHOD FOR PREDICTING AND REMOVING FLOATING WASTE FROM WATER BODIES

FIELD OF THE INVENTION

The present disclosure relates generally to aquatic environmental management systems, and more particularly to an artificial intelligence (AI)-based autonomous system integrated with an autonomous water-cleaning vehicle that predicts and selectively removes floating waste by accurately analyzing type, volume, and vitality, thereby ensuring targeted removal to maintain ecological balance and enhance water quality in water bodies.

BACKGROUND

Water bodies such as oceans, lakes, rivers, and small pools often face pollution due to the continuous accumulation of submerged and floating debris, which includes algae, plastics, paper, organic matter, and other waste materials. This contamination reduces water quality, accelerates eutrophication, obstructs natural light penetration, and disrupts nutrient cycles, leading to ecological degradation. Such pollution also diminishes the aesthetic and recreational value of water bodies and poses potential health risks to surrounding communities. While certain algae, such as green algae, diatoms, and red algae contribute positively to aquatic ecosystems by producing oxygen and supporting biodiversity, harmful species, such as blue-green algae, dinoflagellates, and golden algae generate toxins, deplete dissolved oxygen, and cause harmful algal blooms that severely impact aquatic life. Therefore, the algae-removal mechanism must differentiate between beneficial and harmful species to avoid disturbing the ecological balance.

Additionally, existing floating waste-collection devices and algae-removal mechanisms generally rely on simple optical detection methods, manual assessment, or color-based thresholds. These approaches are incapable of determining algae type, vitality, or concentration and thus remove all detected biomass indiscriminately. Such non-selective removal eliminates essential algae populations, disrupts food chains, reduces dissolved oxygen levels, and weakens ecosystem stability. Other conventional approaches rely on chemical treatment to suppress algae growth; however, chemical agents can harm fish, aquatic plants, and micro-organisms, leave toxic residues in water, and contribute to long-term contamination. Current systems therefore lack the adaptive intelligence required to assess algae characteristics, environmental parameters, and ecological thresholds before initiating removal.

Several tools and frameworks have been developed to assist in floating waste removal and algae detection. A prior art reference, CN110228875A, discloses an algae-monitoring and floating waste-removal device capable of detecting algae based on predefined image characteristics. However, it cannot determine algae vitality, lacks fluorescence-based volume estimation, and does not incorporate predictive mechanism to decide whether removal is environmentally justified. Another prior art reference, CN119418192A, provides a surface-monitoring device that identifies algae patches through basic imaging. However, it does not classify algae into beneficial or harmful categories, cannot assess concentration thresholds, and lacks machine-learning-based analysis for live versus dead algae.

Yet another prior art reference, U.S. Pat. No. 8,367,369B2, teaches an autonomous water-surface cleaning system for collecting debris. However, it does not include algae classification, offers no fluorescence-based vitality detection, and removes surface matter without evaluating ecological thresholds. Additionally, a prior art reference, CN119324004A, describes a water-surface impurity detection robot using image recognition. However, it does not employ fluorescence LiDAR, lacks algae-type differentiation capability, and contains no predictive decision module for selective algae removal.

Other references address environmental monitoring, but still fall short of selective algae removal. A prior art reference, CN109470831B, discloses a water-ecology monitoring robot that collects water-salinity levels and biological images. However, it does not perform algae-specific classification, cannot estimate algae volume using fluorescence decay, and lacks a vitality-based removal decision process. Another prior art reference, CN118273292A, teaches a device that cleans algae and surface garbage using a light-sensing camera and conveyor mechanism. However, its detection method is limited to identifying the presence or absence of algae, cannot differentiate algae species, provides no vitality assessment, and lacks adaptive thresholds based on water salinity.

A prior art reference on UV laser-induced fluorescence LiDAR describes a system for detecting blue-green algae using fluorescence signals. However, it only performs detection, does not classify algae types, lacks integration with autonomous waste-removal hardware, and provides no decision logic for determining when algae should be removed. Another reference on digital holography presents a method for distinguishing living and dead microalgae using interference patterns and machine learning. However, the method is confined to laboratory imaging, does not estimate algae volume, and is not integrated into an autonomous aquatic-cleaning platform for real-time ecological decision-making.

Existing systems, therefore, fail to provide a unified solution capable of selective algae detection, vitality analysis, salinity-dependent thresholding, and volume estimation in a real-time aquatic environment. They do not combine AI-based classification, fluorescence-decay-based vitality assessment, LiDAR volume measurement, and multi-parameter environmental sensing into a cohesive predictive framework. The absence of such integrated intelligence results in indiscriminate removal of useful algae, increased likelihood of harmful bloom formation, ecological imbalance, and greater long-term water-treatment costs. These limitations highlight the need for an advanced, autonomous, and environmentally adaptive system capable of accurately predicting and selectively removing only harmful or excessive algae while simultaneously collecting floating debris to maintain ecological stability in water bodies.

Therefore, there is a need for an artificial intelligence (AI)-based autonomous system integrated with an autonomous water-cleaning vehicle that predicts and selectively removes floating waste by accurately analyzing type, volume, and vitality, thereby ensuring targeted removal to maintain ecological balance and enhance water salinity in water bodies. There is also a need for an AI-based autonomous system that differentiates beneficial algae, such as green algae, diatoms, and red algae, from harmful species, which include cyanobacteria, dinoflagellates, and golden algae to prevent unnecessary ecological disruption. There is also a need for an AI-based autonomous system that incorporates fluorescence-based sensing to distinguish live algae from dead algae using decay-time analysis for more informed removal decisions. There is also a need for an AI-based autonomous system that calculates algae volume using point-cloud processing, regression analysis, or Kalman filtering (Kalman Recursive Estimation Filtering) to determine whether biomass exceeds salinity-dependent ecological thresholds. There is also a need for an AI-based autonomous system that integrates algae type, algae vitality, algae volume, and water salinity into a unified predictive module capable of determining in real time whether algae removal is necessary or ecologically harmful.

There is also a need for an AI-based autonomous system that utilizes machine-learning models such as SVM (Support Vector Machine), K-Means (K-Means Clustering Algorithm), DBSCAN (Density-Based Spatial Clustering of Applications with Noise), and LSTM (Long Short-Term Memory Neural Network) networks to classify algae accurately, detect vitality from fluorescence decay patterns, and support intelligent ecological decision-making. There is also a need for an AI-based autonomous system that employs fuzzy logic (Fuzzy Inference Logic System) and Random Forest classifiers (Random Forest Ensemble Classification Model) to evaluate multiple environmental variables holistically and ensure removal only when harmful and excessive algae are present. There is also a need for an AI-based autonomous system that incorporates AI-driven 360-degree waste and algae detection to automatically steer the autonomous vehicle toward debris and away from ecologically valuable algae. There is also a need for an AI-based autonomous system that autonomously adjusts propelling-wheel speeds based on AI imaging unit input for precise maneuvering, path correction, and obstacle avoidance without manual intervention.

There is also a need for an AI-based autonomous system that combines an AI imaging unit, Fluorescence LiDAR (Light Detection and Ranging), and a water salinity meter (Electrical Conductivity-Based Water Salinity Sensor) to achieve multi-parameter environmental sensing for both debris removal and selective algae management. There is also a need for an AI-based autonomous system that prevents the unnecessary removal of live beneficial algae to maintain oxygen balance, reduce anoxic conditions, and support healthy aquatic metabolism. There is also a need for an AI-based autonomous system that retains algae that absorb excess nitrogen and phosphorus while selectively removing harmful blooms to prevent nutrient-driven ecosystem collapse. There is also a need for an AI-based autonomous system that avoids the drawbacks of conventional chemical treatments by eliminating the need for toxic agents that damages aquatic life and cause long-term contamination.

There is also a need for an AI-based autonomous system that preserves aquatic biodiversity by maintaining essential algae populations, protecting food chains, and preventing habitat loss for zooplankton, fish, and aquatic insects. There is also a need for an AI-based autonomous system that supports sustainable aquaculture by minimizing harmful bloom formation while avoiding over-removal of beneficial algae that serve as natural feed sources.

There is also a need for an AI-based autonomous system that incorporates high-accuracy fluorescence detection with sunlight-resistant filters and timing modules (Laser Timing and Ranging Synchronization Module) to operate reliably across varying daylight conditions, including high-glare midday environments.

There is also a need for an AI-based autonomous system that improves operational efficiency through selective-path navigation, reducing unnecessary energy expenditure on regions that do not require cleaning. There is also a need for an AI-based autonomous system that utilizes dual independent power systems such as Lithium-Ion (Li-Ion) and Lithium-Polymer (Li—Po) batteries to ensure uninterrupted long-duration operation of sensors, motors, and navigation units. There is also a need for an AI-based autonomous system that logs and stores environmental data to support ecological analysis, long-term trend monitoring, and regulatory compliance reporting. There is also a need for an AI-based autonomous system that adapts algae-removal thresholds based on salinity levels to operate effectively across freshwater, brackish, moderately saline, and marine environments.

There is also a need for an AI-based autonomous system that improves water salinity by removing harmful and decaying algae, increasing dissolved oxygen, reducing odor, and preventing toxic bloom formation. There is also a need for an AI-based autonomous system that supports remote operation through IoT (Internet of Things) communication modules, enabling real-time monitoring, data access, and device control using mobile applications. There is also a need for an AI-based autonomous system that automatically avoids obstacles such as walls, buoys, rocks, and other structures to ensure reliable operation in natural and man-made water bodies. There is also a need for an AI-based autonomous system that incorporates corrosion-resistant materials such as High-Density Polyethylene (HDPE), marine-grade aluminum, stainless steel, and fiberglass-reinforced plastics to ensure durability during prolonged exposure to diverse aquatic conditions.

There is also a need for an AI-based autonomous system that achieves high-precision algae detection and volume estimation through Fluorescence LiDAR equipped with narrow-band spectral filtering (Optical Band-Pass Spectral Filtering Module), timing modules (Time-of-Flight Timing Module), and decay-curve analysis (Fluorescence Lifetime Decay Analysis) for accuracy under turbidity and surface-glitter conditions. There is also a need for an AI-based autonomous system that reduces maintenance requirements by employing toroidal salinity sensors (Inductive Toroidal Conductivity Sensors) and marine-grade components that resist fouling and environmental degradation. There is also a need for an AI-based autonomous system that improves overall energy efficiency by harvesting only harmful and excessive algae, minimizing operational cycles and lowering total power consumption.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key nor critical elements of all embodiments, nor delineate the scope of any or all embodiments.

The present disclosure, in one or more embodiments, relates to an artificial intelligence (AI)-based autonomous system integrated with an autonomous water-cleaning vehicle that predicts and selectively removes floating waste by accurately analyzing type, volume, and vitality, thereby ensuring targeted removal to maintain ecological balance and enhance water salinity in water bodies. In one embodiment herein, the AI-based autonomous system comprises a computing device, an autonomous water-cleaning vehicle, a network, a server, a database, and a user device.

In one embodiment herein, the computing device having a controller and a non-transitory memory for storing instructions that are executable by the controller. The computing device is disposed on a floating body of the autonomous water-cleaning vehicle and is configured to automatically maneuver the autonomous water-cleaning vehicle across a water surface to perform a cleaning operation to collect the floating waste that includes organic waste and recyclable waste. The computing device is configured to execute a selective cleaning operation by monitoring and analyzing types of the floating waste and parameters of the organic waste. The parameters include type, volume, and vitality of the organic waste. The selective-removal process enables retention of ecologically beneficial organic waste and facilitates removal of harmful or excessive organic waste from the water surface that negatively impacts water quality. The organic waste can be, but is not limited to, algae.

In one embodiment herein, the controller is configured to receive image data generated by an artificial intelligence (AI) imaging unit, water-salinity levels obtained from a water-salinity sensor, fluorescence-decay lifetime characteristics, temporal-attenuation profiles, and ranging data produced by an optical fluorescence-sensing unit. The AI imaging unit and the optical fluorescence-sensing unit are configured to be disposed on a support frame affixed to the floating body, and the water-salinity sensor is affixed to a front-bottom region of the floating body to enable submerged environmental sampling.

In one embodiment herein, the AI imaging unit is rotatable through 360 degrees. The AI imaging unit is pre-programmed with dataset of images representing the organic waste into ecologically beneficial and ecologically harmful types, enabling precise identification and classification of the organic waste on the water surface. In one embodiment, the dataset of images comprises images of green algae (Chlorophyta), diatoms (Bacillariophyta), red algae (Rhodophyta), blue-green algae (Cyanobacteria), dinoflagellates (Dinophyta), and golden algae (Chrysophyta). The AI imaging unit comprises a waterproof and corrosion-resistant enclosure configured for outdoor aquatic operation. The water-salinity sensor is a toroidal conductivity salinity meter partially immersed in water.

In one embodiment herein, the optical fluorescence-sensing unit comprises a laser source emitting at 450-532 nanometers, a beam steering unit, a fluorescence detector, a spectral filter, and a timing and ranging module.

In one embodiment herein, the controller is an NVIDIA Jetson Orin Nano 8 GB module housed within the floating body. The controller is configured to generate a unified, time-synchronized, multi-parameter dataset by performing normalization and synchronization of the image data, the water-salinity levels, and the fluorescence-decay lifetime characteristics and ranging data, thereby producing a reduced-dimensional computational representation that eliminates redundant data and compresses salient feature vectors into a compact form suitable for real-time inference and control execution on the controller. The normalization and synchronization of the image data, the water-salinity levels, and the fluorescence-decay lifetime characteristics and ranging data reduces inference latency and improves selective-removal accuracy.

In one embodiment herein, the controller is configured to classify the organic waste into ecologically beneficial and ecologically harmful types using the AI imaging unit. The controller is configured to determine a vitality level of the organic waste by analyzing the fluorescence-decay lifetime characteristics and the temporal-attenuation profiles using a machine learning model. The controller is pre-programmed with fluorescence decay pattern data for determining organic waste vitality. The machine learning model can be, but is not limited to, support vector machine (SVM), k-means clustering, DBSCAN clustering, or long short-term memory (LSTM) networks.

In one embodiment herein, the temporal-attenuation profiles are fluorescence decay patterns with decay times between 650-1100 nanoseconds for live algae and under 500 nanoseconds for dead algae.

In one embodiment herein, the controller is configured to compute the volume of the organic waste using the fluorescence intensity, the ranging data, and data processing techniques to generate a three-dimensional biomass model, thereby enabling structured volumetric estimation and optimized memory usage during point-cloud reconstruction. The data processing techniques can be, but is not limited to, regression analysis, point cloud processing, and kalman filter model. The point-cloud reconstruction techniques utilize fluorescence intensity and LiDAR ranging data to generate three-dimensional biomass estimates.

In one embodiment herein, the controller is configured to compare the types, the vitality level, and the volume of the organic waste with salinity-dependent ecological threshold values stored in the non-transitory memory to generate an organic-waste removal decision using a decision model. The dynamic ecological thresholding reduces unnecessary removal of beneficial organic waste, and improves selective-removal accuracy compared to fixed-threshold systems. The decision model can be, but is not limited to, fuzzy logic and random forest classifier model. The organic-waste removal decision is generated by comparing the computed volume against salinity-dependent threshold values stored in the non-transitory memory.

In one embodiment herein, the salinity-dependent ecological threshold values define maximum beneficial organic waste volumes of 10-30 $g/m^3$ for salinity below 0.5 ppt, 30-50 $g/m^3$ for salinity 0.5-5 ppt, 50-100 $g/m^3$ for salinity 5-18 ppt, 100-200 $g/m^3$ for salinity 18-30 ppt, 200-500 $g/m^3$ for salinity 30-35 ppt, and over 500 $g/m^3$ for salinity above 35 ppt.

In one embodiment herein, the controller is configured to activate a conveyor unit of the autonomous water-cleaning vehicle when the removal decision indicates harmful, dead, or excessive organic waste by the decision model, and inhibit activation when the organic waste is determined to be beneficial and below threshold levels, thereby reducing mechanical load and decreasing energy consumption.

In one embodiment herein, the controller is configured to command a navigation unit to maneuver the autonomous water-cleaning vehicle toward or away from detected organic-waste regions based on the removal decision, thereby increasing propulsion efficiency and reducing energy consumption through optimized path-planning. The navigation unit can be, but is not limited to, a global positioning system (GPS) and a global navigation satellite system (GNSS) for real-time geolocation tracking, an inertial measurement unit (IMU) with accelerometers and gyroscopes for precise orientation and motion control, and an obstacle detection and avoidance system that utilizes sonar, LiDAR (Light Detection and Ranging), and AI-based path-planning model.

In one embodiment herein, the computing device is configured to selectively activate the conveyor unit to remove the harmful or excessive organic waste as determined by the organic-waste removal decision from the water surface, thereby producing a tangible modification to the water body.

In one embodiment herein, the computing device is configured to communicate with a user device via a network through IoT communication modules. The AI-based autonomous system is configured to enable a user to manually operate the autonomous water-cleaning vehicle through the user device via a multi-platform application.

In another embodiment of the invention, a method for predicting and selectively removing organic waste and floating waste in water bodies using an artificial intelligence (AI)-based autonomous system. At one step, the controller receives the image data of the organic waste generated by the artificial intelligence (AI) imaging unit, the water-salinity levels obtained from the water-salinity sensor, the fluorescence-decay lifetime characteristics, the temporal-attenuation profiles, and the ranging data of the organic waste produced by the optical fluorescence-sensing unit. The organic waste is algae.

At one step, the controller generates a unified, time-synchronized, multi-parameter dataset by performing normalization and synchronization of the image data, the water-salinity levels, and the fluorescence-decay lifetime characteristics and ranging data. At one step, the controller classifies organic waste into ecologically beneficial and ecologically harmful types using the AI imaging unit. The AI imaging unit is pre-programmed with dataset of images representing green algae (Chlorophyta), diatoms (Bacillariophyta), red algae (Rhodophyta), blue-green algae (Cyanobacteria), dinoflagellates (Dinophyta), and golden algae (Chrysophyta).

At one step, the controller determines a vitality level of the organic waste based on the fluorescence-decay lifetime characteristics and the temporal-attenuation profiles using a machine learning model. The controller is pre-programmed with fluorescence decay pattern data for determining organic waste vitality. The machine learning model can be, but is not limited to, support vector machine (SVM), k-means clustering, DBSCAN clustering, or long short-term memory (LSTM) networks. The temporal-attenuation profiles are fluorescence decay patterns with decay times between 650-1100 nanoseconds.

At one step, the controller computes the volume of the organic waste using the fluorescence intensity, the ranging data, and point-cloud reconstruction techniques to generate a three-dimensional biomass model, thereby enabling structured volumetric estimation and optimized memory usage during point-cloud reconstruction. The point-cloud reconstruction techniques can be, but is not limited to, regression analysis, point cloud processing, or kalman filter model.

At one step, the controller compares the types, the vitality level, and the volume of the organic waste with salinity-dependent ecological threshold values stored in the non-transitory memory to generate an organic-waste removal decision using a decision model. The dynamic ecological thresholding reduces unnecessary removal of beneficial organic waste. The decision model can be, but is not limited to, fuzzy logic and random forest classifier models. The organic-waste removal decision is generated by comparing the computed volume against salinity-dependent threshold values stored in non-transitory memory. the salinity-dependent ecological threshold values define maximum beneficial organic waste volumes of 10-30 $g/m^3$ for salinity below 0.5 ppt, 30-50 $g/m^3$ for salinity 0.5-5 ppt, 50-100 $g/m^3$ for salinity 5-18 ppt, 100-200 $g/m^3$ for salinity 18-30 ppt, 200-500 $g/m^3$ for salinity 30-35 ppt, and over 500 $g/m^3$ for salinity above 35 ppt.

At one step, the controller activates a conveyor unit of the autonomous water-cleaning vehicle when the removal decision indicates harmful, dead, or excessive organic waste by the decision model, and inhibits activation when the organic waste is determined to be beneficial and below threshold levels, thereby reducing mechanical load and decreasing energy consumption.

At one step, the controller commands a navigation unit to maneuver the autonomous water-cleaning vehicle toward or away from detected organic-waste regions based on the removal decision, thereby increasing propulsion efficiency and reducing energy consumption through optimized path-planning. At one step, a computing device enables selective activation of the conveyor unit to remove the harmful or excessive organic waste as determined by the organic-waste removal decision from the water surface, thereby producing a tangible modification to the water body.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

FIG. 6 illustrate a flow chart of a method for predicting and selectively removing floating waste from water bodies using the artificial intelligence (AI)-based autonomous system, in accordance with embodiments of the invention.

DETAILED DESCRIPTION

Figure 1A:
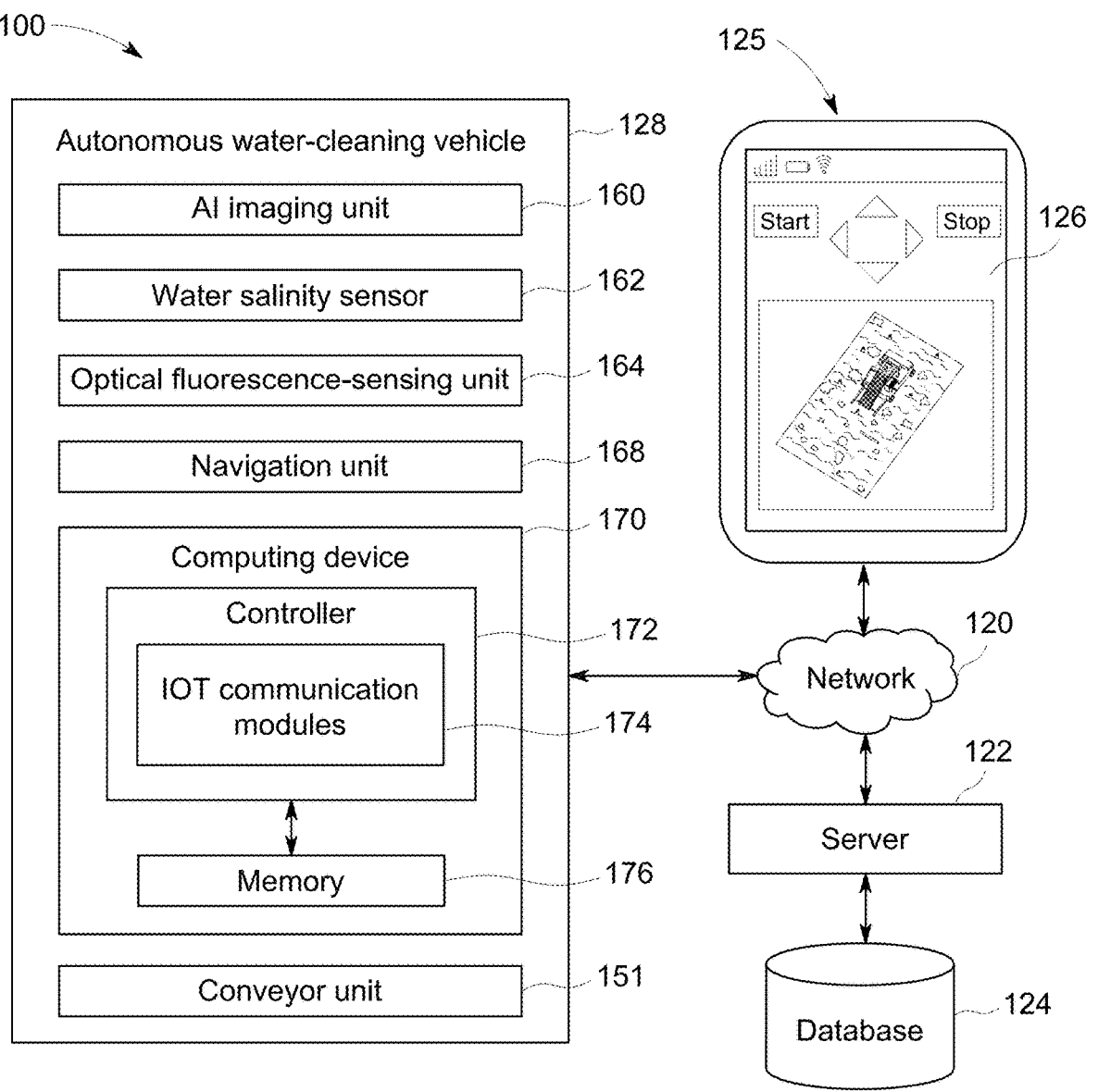
FIG. 1A illustrates a block diagram of an artificial intelligence (AI)-based autonomous system for predicting and selectively removing floating waste from water bodies, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1A refers to a block diagram of an artificial intelligence (AI)-based autonomous system 100 for predicting and removing floating waste 10 in water bodies. In one embodiment herein, the artificial intelligence (AI)-based autonomous system 100 integrated with an autonomous water-cleaning vehicle 128 predicts and selectively removes floating waste 10 by accurately analyzing type, volume, and vitality, thereby ensuring targeted removal to maintain ecological balance and enhance water quality in water bodies. In one embodiment herein, The AI-based autonomous system 100 comprises a computing device 170, an autonomous water-cleaning vehicle 128, a network 120, a server 122, a database 124, and a user device 125.

Figure 4:
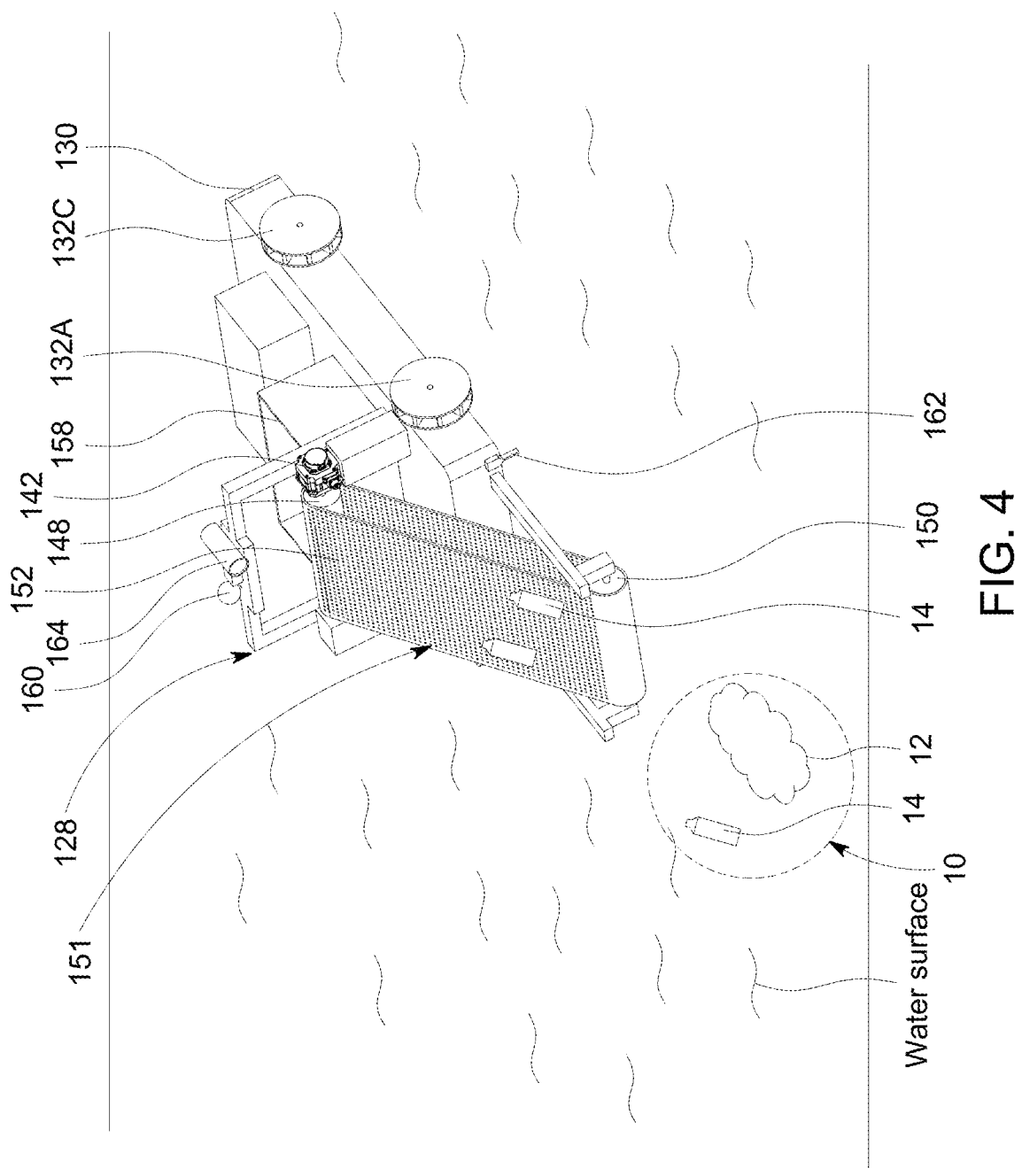
FIG. 4 illustrates a schematic view of the autonomous water-cleaning vehicle while removing the harmful or excessive organic waste as determined by the organic-waste removal decision from the water surface, in accordance with embodiments of the invention.

In one embodiment herein, the computing device 170 comprises a controller 172 and a non-transitory memory 176 for storing instructions executable by the controller 172. The computing device 170 is disposed on a floating body 130 of the autonomous water-cleaning vehicle 128 and functions as a control unit that controls the operation of the vehicle. The computing device 170 is configured to automatically maneuver the autonomous water-cleaning vehicle 128 across a water surface to perform a cleaning operation to collect floating waste 10 comprises organic waste 12 and recyclable waste 14, as shown in FIG. 4. The computing device 170 is configured to execute a selective cleaning operation by monitoring and analyzing types of the floating waste and parameters of the organic waste. The parameters include type, volume, and vitality of the organic waste 12. The selective-removal process enables retention of ecologically beneficial organic waste and facilitates removal of harmful or excessive organic waste from the water surface, thereby improving water quality. The organic waste 12 can be, but is not limited to, algae.

In one embodiment herein, the controller 172 is configured to receive image data generated by an artificial intelligence (AI) imaging unit 160, water-salinity levels obtained from a water-salinity sensor 162, fluorescence-decay lifetime characteristics, temporal-attenuation profiles, and ranging data produced by an optical fluorescence-sensing unit 164.

The AI imaging unit 160 and the optical fluorescence-sensing unit 164 are disposed on a support frame 140 affixed to the floating body 130, and the water-salinity sensor 162 is affixed to a front-bottom region of the floating body 130 to enable submerged environmental sampling. In one embodiment herein, the water-salinity sensor 162 is a toroidal conductivity salinity meter partially immersed in water.

In one embodiment herein, the AI imaging unit 160 is rotatable through 360 degrees. The AI imaging unit 160 is pre-programmed with dataset of images representing the organic waste 12 into ecologically beneficial and ecologically harmful types, enabling precise identification and classification of the organic waste on the water surface. In one embodiment, the dataset of images can be, but is not limited to, images of green algae (Chlorophyta), diatoms (Bacillariophyta), red algae (Rhodophyta), blue-green algae (Cyanobacteria), dinoflagellates (Dinophyta), and golden algae (Chrysophyta). The AI imaging unit 160 comprises a waterproof and corrosion-resistant enclosure configured for outdoor aquatic operation.

As used herein, the term "type" of the organic waste refers to the categorical classification output generated by the AI imaging unit based on image-feature extraction and comparison against a pre-programmed dataset comprising labeled species groups including Chlorophyta, Bacillariophyta, Rhodophyta, Cyanobacteria, Dinophyta, and Chrysophyta.

Figure 1B:
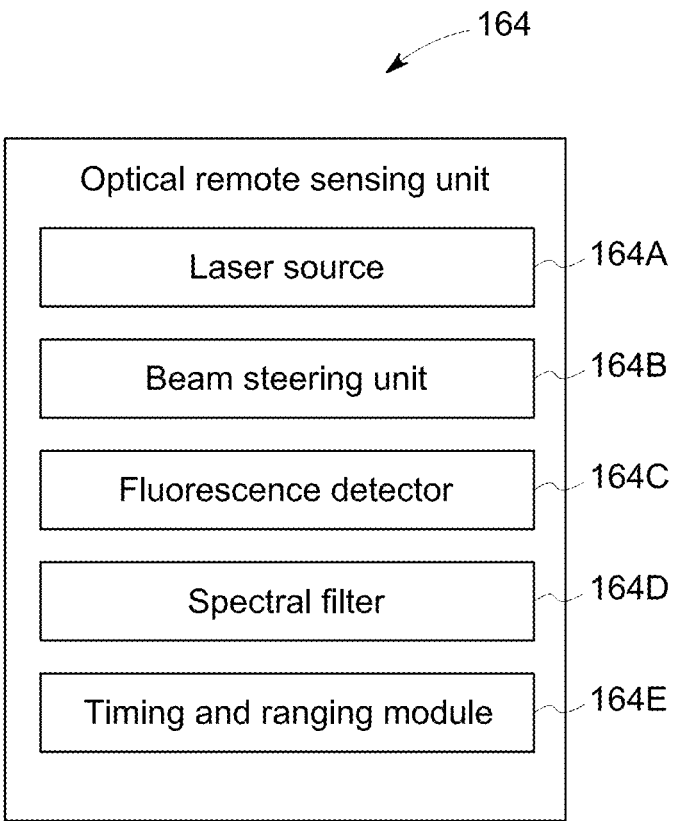
FIG. 1B illustrates a block diagram of the optical fluorescence-sensing unit of the autonomous water-cleaning vehicle, in accordance with embodiments of the invention.

In one embodiment herein, the optical fluorescence-sensing unit 164 comprises a laser source 164A emitting at 450-532 nanometers, a beam steering unit 164B, a fluorescence detector 164C, a spectral filter 164D, and a timing and ranging module 164E, as shown in FIG. 1B, to improve accuracy and efficiency in detecting contaminants.

In one embodiment herein, the controller 172 is an NVIDIA Jetson Orin Nano 8 GB module housed within the floating body 130. The controller 172 is configured to generate a unified, time-synchronized, multi-parameter dataset by performing normalization and synchronization of the image data, the water-salinity levels, and the fluorescence-decay lifetime characteristics and ranging data, thereby producing a reduced-dimensional computational representation that eliminates redundant data and compresses salient feature vectors into a compact form suitable for real-time inference and control execution on the controller 172. The normalization and synchronization of the image data, the water-salinity levels, and the fluorescence-decay lifetime characteristics and ranging data reduces inference latency and improves selective-removal accuracy.

In one embodiment herein, the controller 172 is configured to classify the organic waste 12 into ecologically beneficial and ecologically harmful types using the AI imaging unit 160. The controller 172 is configured to determine a vitality level of the organic waste by analyzing the fluorescence-decay lifetime characteristics and the temporal-attenuation profiles using a machine learning model, wherein the controller 172 is pre-programmed with fluorescence decay pattern data for determining organic waste vitality. The machine learning model can be, but is not limited to, support vector machine (SVM), k-means clustering, DBSCAN clustering, or long short-term memory (LSTM) networks.

In one embodiment herein, the temporal-attenuation profiles are fluorescence decay patterns with decay times between 650-1100 nanoseconds for live algae and under 500 nanoseconds for dead algae. The term "vitality" refers to the metabolic activity state of the organic waste, quantified by analyzing fluorescence-decay lifetime characteristics and temporal-attenuation profiles obtained from the optical fluorescence-sensing unit 164, wherein vitality is categorized as 'live' when decay-time T lies within the 650-1100 nanosecond range and categorized as 'dead' when decay-time T falls below 500 nanoseconds, with intermediate values classified using the trained machine-learning vitality-classification model.

In one embodiment herein, the controller 172 is configured to compute the volume of the organic waste 12 using the fluorescence intensity, the ranging data, and data processing techniques to generate a three-dimensional biomass model, thereby enabling structured volumetric estimation and optimized memory usage during point-cloud reconstruction. The data processing techniques can be, but is not limited to, regression analysis, point cloud processing, and kalman filter model. The point-cloud reconstruction techniques utilize fluorescence intensity and LiDAR ranging data to generate three-dimensional biomass estimates.

In one embodiment herein, the controller 172 is configured to compare the types, the vitality level, and the volume of the organic waste 12 with salinity-dependent ecological threshold values stored in the non-transitory memory 176 to generate an organic-waste removal decision using a decision model. The dynamic ecological thresholding reduces unnecessary removal of beneficial organic waste and improves selective-removal accuracy compared to fixed-threshold systems. The decision model can be, but is not limited to, fuzzy logic and random forest classifier model. The organic-waste removal decision is generated by comparing the computed volume against salinity-dependent threshold values stored in the non-transitory memory 176. The term "volume" refers to the three-dimensional biomass magnitude computed by the controller 172 using fluorescence-LiDAR range measurements and fluorescence-intensity values to generate a point-cloud representation of the detected organic waste, wherein the controller 172 calculates the biomass volume by performing point-cloud clustering, surface fitting, and voxel-based integration.

In one embodiment herein, the salinity-dependent ecological threshold values define maximum beneficial organic waste volumes of 10-30 g/m$^3$ for salinity below 0.5 ppt, 30-50 g/m$^3$ for salinity 0.5-5 ppt, 50-100 g/m$^3$ for salinity 5-18 ppt, 100-200 g/m$^3$ for salinity 18-30 ppt, 200-500 g/m$^3$ for salinity 30-35 ppt, and over 500 g/m$^3$ for salinity above 35 ppt.

Figure 2A:
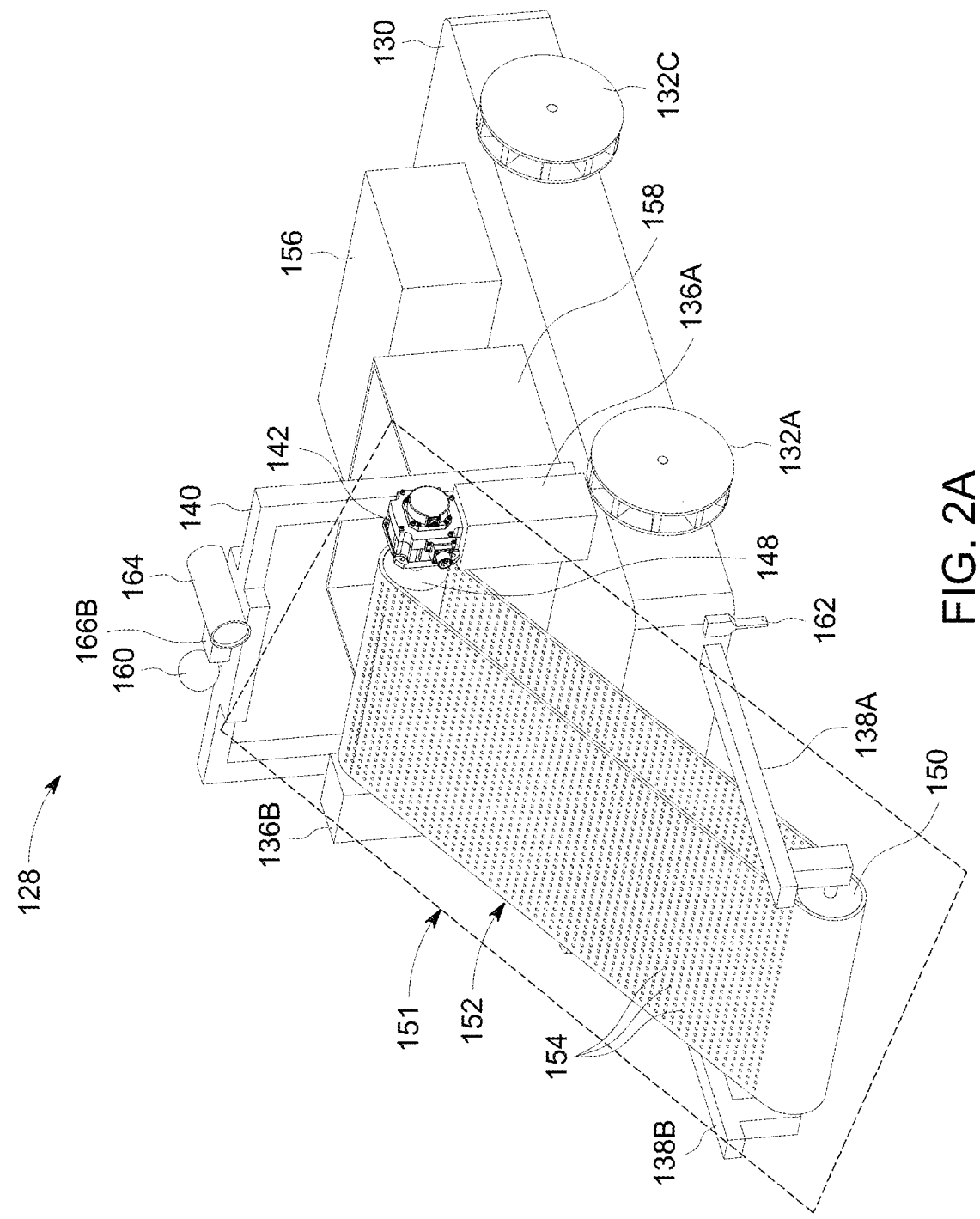
FIG. 2A illustrates an isometric view of the autonomous water-cleaning vehicle, in accordance with embodiments of the invention.

In one embodiment herein, the controller 172 is configured to activate a conveyor unit 151 of the autonomous water-cleaning vehicle 128 when the removal decision indicates harmful, dead, or excessive organic waste by the decision model, and inhibit activation when the organic waste is determined to be beneficial and below threshold levels, thereby reducing mechanical load and decreasing energy consumption. The conveyor unit 151 comprises an inclined conveyor belt 152 with drainage perforations 154, a first roller 148, and a second roller 150, as shown in FIG. 2A. The first roller 148 is connected to a driving unit 142. The second roller 150 is positioned at a submerged front end of the floating body 130.

In one embodiment herein, the controller 172 is configured to command a navigation unit 168 to maneuver the autonomous water-cleaning vehicle 128 toward or away from detected organic-waste regions based on the removal decision, thereby increasing propulsion efficiency and reducing energy consumption through optimized path-planning. The navigation unit 168 can be, but is not limited to, a global positioning system (GPS) and a global navigation satellite system (GNSS) for real-time geolocation tracking, an inertial measurement unit (IMU) with accelerometers and gyroscopes for precise orientation and motion control, and an obstacle detection and avoidance system that utilizes sonar, and an AI-based path-planning model.

In one embodiment herein, the computing device 170 is configured to selectively activate the conveyor unit 151 to remove harmful or excessive organic waste from the water surface, as determined by the organic-waste removal decision, thereby producing a tangible modification to the water body.

In one embodiment herein, the computing device 170 is configured to communicate with a user device 125 via a network 120 through IoT communication modules 174. The AI-based autonomous system 100 is configured to enable a user to manually operate the autonomous water-cleaning vehicle 128 through the user device 125 via a multi-platform application.

In one embodiment herein, the user device 125 is configured to enable a user to remotely monitor and control the autonomous water-cleaning vehicle 128. The user device 125 can be, but is not limited to, a smartphone, a laptop, a tablet, or any suitable electronic device capable of wireless communication.

In one embodiment herein, the user device 125 comprises the user interface 126, which is configured to allow the user to input commands, view system status, and operate the autonomous water-cleaning vehicle 128 when manual control is required. As shown in FIG. 1A, the user interface 126 presents buttons for Start, Stop, and directional controls for forward, backward, left, and right movement, enabling direct manual maneuvering of the autonomous water-cleaning vehicle 128. The user interface 126 can be, but is not limited to, a display unit. The user interface 126 further displays visuals from the AI imaging unit 160, system alerts, and organic waste removal decisions generated by the controller 172. The AI-based autonomous system 100 is configured to enable a user to manually operate the autonomous water-cleaning vehicle 128 through the user device 125 via a multi-platform application.

In one embodiment herein, the computing device 170 is configured to establish a persistent bidirectional communication link with at least one remote user device 125 via the network 120 utilizing the IoT communication modules 174. This link facilitates the real-time streaming of telemetry data from the autonomous water-cleaning vehicle 128 to the user device 125 and the concurrent transmission of operational commands from the user device 125 back to the vehicle 128.

In one embodiment herein, the AI-based autonomous system 100 includes a multi-platform control application comprising executable instructions stored on the user device 125.

The application provides a dual-mode operational interface that integrates manual vehicle control with the autonomous AI decision-making framework. The interface mode is selectively switchable by the user.

In one embodiment herein, the multi-platform application operates in a first autonomous monitoring mode. In this mode, the application renders a graphical interface presenting a synthesized data overlay on a live video feed from the AI imaging unit 160. This overlay visually distinguishes regions of ecologically beneficial organic waste from ecologically harmful organic waste as classified by the controller 172, and further displays the projected navigation path of the autonomous water-cleaning vehicle 128.

In one embodiment herein, the multi-platform application operates in a second manual override mode. In this mode, the application renders a direct teleoperation interface, wherein user input via the user device 125 generates real-time command signals for the propulsion and steering mechanisms of the autonomous water-cleaning vehicle 128. The manual override mode enables direct user control of the conveyor unit 151 activation independent of the organic-waste removal decision generated by the controller 172.

In one embodiment herein, the direct teleoperation interface presented by the multi-platform application comprises a dynamic touch-based steering control element superimposed on the live video feed. The interface further includes at least one dedicated virtual actuator for conveyor unit 151 control and an interactive map element allowing the user to define a navigation waypoint by selecting a location on the displayed video feed, whereby the controller 172 commands the navigation unit 168 to maneuver the vehicle to the user-selected location.

In one embodiment herein, the controller 172 is configured to generate a priority alert signal upon detecting a predefined operational condition, such as an obstacle detection event or a sensor fault indication. The IoT communication modules 174 transmit this alert signal to the user device 125, causing the multi-platform application to present a prominent visual and haptic notification and prompt the user to switch from the autonomous monitoring mode to the manual override mode.

In one embodiment herein, the computing device 170 is configured to log a sequential record of all operational events, including periods of autonomous operation and instances of manual override intervention. This record chronologically associates sensor data, AI-generated decisions, user-initiated commands, and vehicle actuator responses, thereby creating an auditable trail for operational review and system performance analysis.

In one embodiment herein, the multi-platform application comprises an interface configured to allow the user to remotely monitor and control the autonomous water-cleaning vehicle 128. The multi-platform application is executed on various user devices 125, which include smartphones, laptops, tablets, and personal computers, providing flexibility for the user to engage with the AI-based autonomous system 100 from all locations. The application enables visualization of the AI imaging unit feed, system alerts, and the status of organic waste removal operations.

The multi-platform application comprises functionality for manual operation of the autonomous water-cleaning vehicle 128, which include start and stop buttons and directional control for forward, backward, left, and right movement. Additionally, the application allows users to adjust operational parameters and configure cleaning schedules. Alerts related to system status, environmental changes, and detected organic waste conditions are displayed on the user interface 126, thereby ensuring efficient control and management of the AI-based autonomous system 100.

In one embodiment herein, the network 120 can be, but is not limited to, a Local Area Network (LAN), a Cellular Network, a Wide Area Network (WAN), an Intranet, a Virtual Private Network (VPN), and wireless networks that use radio frequency (RF) and infrared (IR) technology to transmit data without physical cables, thereby providing mobility and flexibility. The versatility of the network 120 ensures that the computing device 170 and the user device 125 seamlessly connect to the server 122 and the database 124, thereby enabling the users to access functionalities of the AI-based autonomous system 100 and resources from a variety of locations and devices. This wireless connectivity enhances the overall accessibility and convenience of the AI-based autonomous system 100 for the users.

In one embodiment herein, the controller 172 of the computing device 170 is configured to receive the image data, the water-salinity levels, the fluorescence-decay lifetime characteristics, and the ranging data, and store the fluorescence-decay patterns in the database 124. The controller 172 of the computing device 170 is configured to normalise and synchronise the received data elements as an input dataset and stores them in the database 124 for organic waste type classification, organic waste vitality analysis, and organic waste volume estimation.

FIG. 1B refers to a block diagram of the optical fluorescence-sensing unit 164 of the autonomous water-cleaning vehicle 128. In one embodiment herein, the AI-based autonomous system 100 is configured to control and optimize the autonomous water-cleaning vehicle 128 for predicting and removing the floating waste 10 from water bodies. The floating waste 10 comprises the organic waste 12 and the recyclable waste 14. The organic waste 12 comprises algae. The AI-based autonomous system 100 integrates multiple computational, analytical, and decision-making functionalities to enable autonomous, efficient, and real-time water cleaning operations. In one embodiment herein, the optical fluorescence-sensing unit 164 is configured to utilize infrared (IR), multispectral, and hyperspectral imaging for remote algae detection and water composition mapping. The optical fluorescence-sensing unit 164 identifies spectral signatures associated with harmful cyanobacteria blooms and floating debris 10, differentiating between non-toxic algae and hazardous blooms such as red tides. Additionally, the optical fluorescence-sensing unit 164 detects oil spills, industrial discharge, and chemical runoff from distant locations, providing a broader assessment of water pollution. By integrating with the AI imaging unit 160 and water-salinity sensor 162, the optical fluorescence-sensing unit 164 enhances the AI-based autonomous system's ability to predict contamination trends and optimize cleaning strategies.

In one embodiment herein, the optical fluorescence-sensing unit 164 comprises a laser source 164A, a beam steering unit 164B, a fluorescence detector 164C, a spectral filter 164D, and a timing and ranging module 164E to improve accuracy and efficiency in detecting contaminants. The laser source 164A emits a controlled laser beam to illuminate water surfaces, enhancing visibility and detection precision. The beam steering unit 164B dynamically adjusts the laser direction to scan a wide area for pollutants. The fluorescence detector 164C captures and analyzes fluorescence signals from chlorophyll-a and other biological markers, allowing precise identification of harmful algae. The spectral filter 164D isolates specific wavelengths for targeted analysis, improving spectral resolution in detecting different types of contaminants. The timing and ranging module 164E is configured to measure the time delay and intensity of reflected signals, enabling precise distance calculations and 3D mapping of water conditions. The integration of these components enhances the ability of the optical fluorescence-sensing unit 164 to detect, classify, and assess contaminants with high accuracy.

Figure 2B:
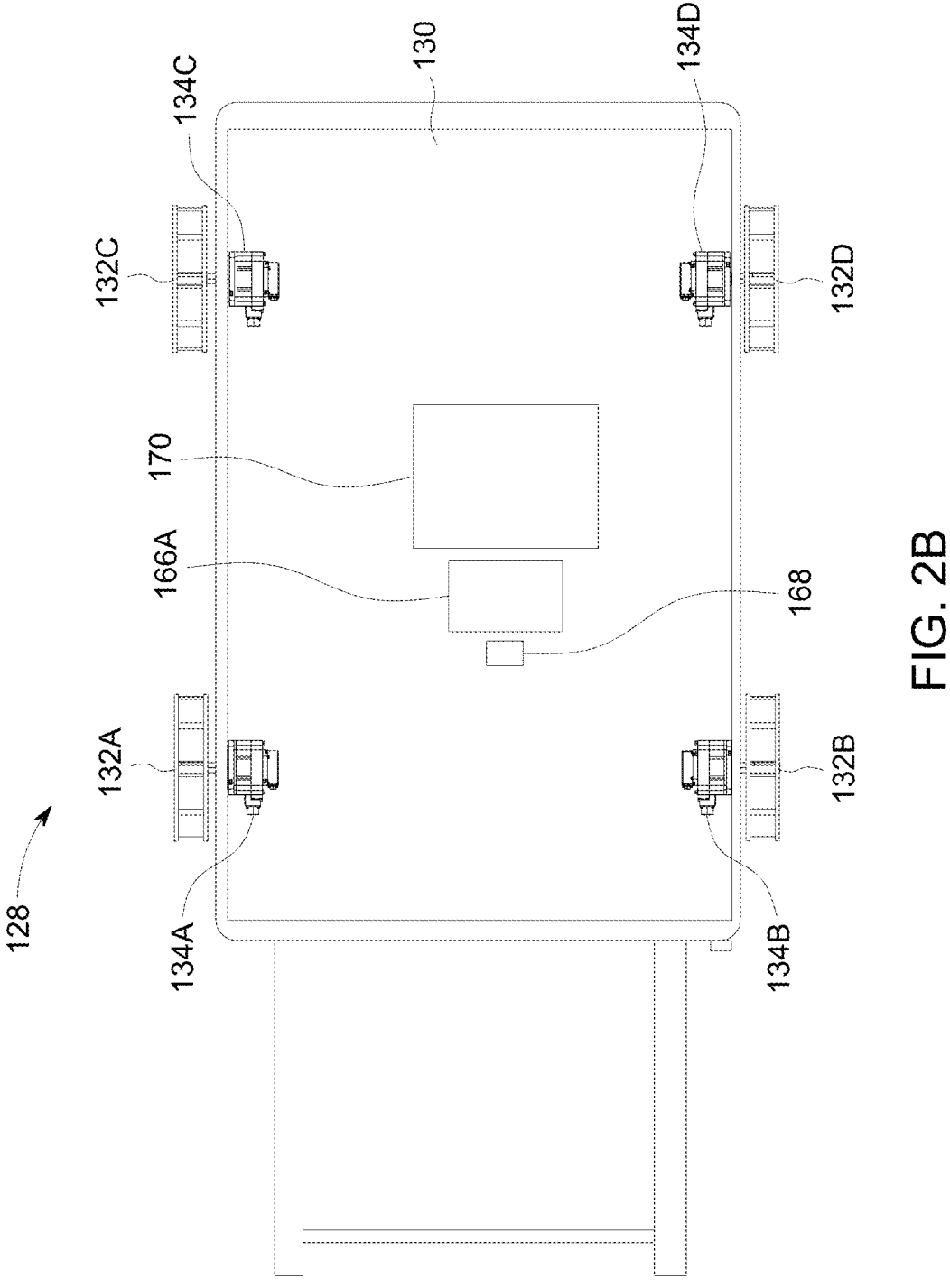
FIG. 2B illustrates a bottom view of the autonomous water-cleaning vehicle, in accordance with embodiments of the invention.

FIG. 2A refers an isometric view of the autonomous water-cleaning vehicle 128, in accordance with one embodiment of the invention. FIG. 2B refers a bottom view of the autonomous water-cleaning vehicle 128, in accordance with one embodiment of the invention. The autonomous water-cleaning vehicle 128 is configured to automatically maneuver across a water surface to perform a cleaning operation to collect the floating waste 10 comprises the organic waste 12 and the recyclable waste 14. The organic waste 12 comprises the algae. In one embodiment herein, the autonomous water-cleaning vehicle 128 comprises a floating body 130, a plurality of propelling wheels (132A, 132B, 132C, 132D), one or more motors (134A, 134B, 134C, 134D), a primary supporter 136A, a secondary supporter 136B, a first extended column 138A, a second extended column 138B, a supporting frame 140, the driving unit 142, the conveyor unit 151, a counterweight 156, a container 158, the AI imaging unit 160, the water-salinity sensor 162, the optical fluorescence-sensing unit 164, a primary power source 166A, a secondary power source 166B, the navigation unit 168, and the controller 172.

In one embodiment herein, the floating body 130 is configured rectangular-shaped hollow structure and buoyancy nature. The floating body 130 enables the autonomous water-cleaning vehicle 128 to move and float on the water surface. The corners of the floating body 130 are configured as curved shape, which assists the vehicle's propelling action on the water surface. In one embodiment herein, the plurality of propelling wheels (132A, 132B, 132C, 132D) is operatively connected to each corner of the floating body 130. a first wheel 132A, a second wheel 132B, a third wheel 132C, a fourth wheel 132D, as shown in FIG. 2B. The one or more motors (134A, 134B, 134C, 134D) include a first motor 134A, a second motor 134B, a third motor 134C, a fourth motor 134D, as shown in the FIG. 2B.

In one embodiment herein, the first wheel 132A is operatively connected to the first motor 134A within the floating body 130. The second wheel 132B is operatively connected to the second motor 134B within the floating body 130. The third wheel 132C is operatively connected to the third motor 134C within the floating body 130. The fourth wheel 132D is operatively connected to the fourth motor 134D within the floating body 130. In one embodiment herein, the primary supporter 136A and the secondary supporter 136B are mounted on the floating body 130. The container 158 is inclinedly positioned between the primary supporter 136A and the secondary supporter 136B.

In one embodiment herein, Table 1 depicts specifications of the one or more motors (134A, 134B, 134C, 134D).

conveyor unit 151 is mounted between the first extended column 138A and the second extended column 138B. In one embodiment herein, the conveyor unit 151 comprises a driving unit a first roller 148, a second roller 150, the inclined conveyor belt 152. In one embodiment herein, the second roller 150 is rotatably positioned between the first extended column 138A and the second extended column 138B. The first roller 148 is an active roller. The second roller 150 is a passive roller.

In one embodiment herein, the inclined conveyor belt 152 is movably positioned around the first roller 148 and the second roller 150. The first roller 148 and the second roller 150 rotate in at least one direction upon activation of the driving unit 142 to drive the inclined conveyor belt 152 over the water surface for collecting the organic waste 12 and the recyclable waste 14. In one embodiment herein, the coun-

TABLE 1

| Parameter | Preferred Spec | Acceptable Range | Notes |
|---|---|---|---|
| Motor type | 24 V BLDC + planetary gearbox (marine-sealed) | 24 V brushed DC + planetary | BLDC = higher efficiency/longer life |
| Continuous power (per motor) | 80-120 W | 60-150 W | Sized for steady cruise with margin |
| Peak power (≤3 s, per motor) | 200-300 W | 150-400 W | For quick turns, weed escape |
| Gear ratio | 20:1-30:1 | 15:1-40:1 | Puts output in 100-160 rpm zone |
| Output speed (post-gear) | 100-160 rpm | 80-200 rpm | For paddle tip speed ≈0.8-1.2 m/s (R ≈ 100 mm) |
| Output torque (continuous) | 4-6 N · m | 3-8 N · m | Gives usable thrust with slip losses |
| Peak torque (≤3 s) | 10-14 N · m | 8-18 N · m | Short surge for maneuvering |
| Supply/current (per motor) | 24 V, 4-6 A cont.; 12-18 A peak | — | Size driver 25-30 A peak |
| Encoder | Incremental 512-1024 CPR (A/B/Z) | 256-2048 CPR | Closed-loop speed/heading hold |
| Brake (optional) | 24 V holding brake ≥1 N · m | 0.5-2 N · m | Holds position against wind/current |
| Shaft/mount | Ø10 mm keyed, face-mount 63 mm class | Ø8-12 mm | Stainless shaft & hardware |
| Bearings/seals | Double-sealed bearings, shaft seal + slinger | — | Keep spray out; grease ports if possible |
| Protection | IP67-IP68 motor + gearbox | IP65-IP68 | Splash/brief immersion ready |
| Corrosion resistance | Epoxy-coated housing, SS fasteners | — | Fresh/brackish duty |
| Operating temp | −10° C. to +60° C. | −20° C. to +70° C. | Outdoor range |
| Motor controller | Dual 24 V BLDC FOC, 30 A peak/channel, regen clamp | 20-40 A peak | Current limit + stall detect |
| Cable/connector | Shielded 4-core + M12 (IP67) | — | Keep encoder lines twisted/shielded |

In one embodiment herein, the driving unit 142 is operatively positioned on the primary supporter 136A. The first roller 148 is rotatably positioned between the primary supporter 136A and the secondary supporter 136B. In one embodiment herein, the one end of the first roller 148 is rotatably connected to the driving unit 142 to rotate in at least one direction upon activating the driving unit 142. In one embodiment herein, the front end of the floating body 130 is configured with the first extended column 138A and the second extended column 138B.

In one embodiment herein, the conveyor unit 151 is mounted between the primary supporter 136A and the secondary supporter 136B at one end, and the other end of terweight 156 is positioned at the rear end of the floating body 130 to counterbalance the weight of the inclined conveyor belt 152. The inclined conveyor belt 152 includes drainage perforations 154 that reduce the hydraulic load on the conveyor drive mechanism by draining water during waste collection, thereby decreasing energy consumption by approximately 15-30% compared to a non-perforated belt while maintaining collection efficiency of organic waste 12 and recyclable waste 14. In one embodiment herein, the container 158 is inclinedly positioned underneath the inclined conveyor belt 152 to receive and store the organic waste 12 and the recyclable waste 14. In one embodiment herein, Table 2 depicts specifications of the driving unit 142.

TABLE 2

| Parameter | Driving unit |
| --- | --- |
| Type | Geared DC Motor |
| Voltage | 12 V DC |
| Power Rating | 100-150 W (low-speed torque) |
| Torque | Medium (for conveyor load) |
| Speed | 60-100 RPM |

In one embodiment herein, the supporting frame 140 is perpendicularly positioned on the floating body 130 and beneath the container 158. The AI imaging unit 160 is mounted on the supporting frame 140. The AI imaging unit 160 is a 360-degree rotatable camera designed to detect the floating waste 10 from all sides of the water surface. In one embodiment herein, the AI imaging unit 160 is rotatable through 360 degrees. The AI imaging unit 160 is pre-programmed with dataset of images representing the organic waste 12 into ecologically beneficial and ecologically harmful types, enabling precise identification and classification of the organic waste on the water surface. In one embodiment, the dataset of images comprises images of green algae (Chlorophyta), diatoms (Bacillariophyta), red algae (Rhodophyta), blue-green algae (Cyanobacteria), dinoflagellates (Dinophyta), and golden algae (Chrysophyta). The AI imaging unit 160 comprises a waterproof and corrosion-resistant enclosure configured for outdoor aquatic operation.

In one embodiment herein, the water-salinity sensor 162 is integrated at the front end of the floating body 130 to continuously monitor the salinity levels of the water. The water-salinity sensor 162 is the toroidal conductivity salinity meter partially immersed in water. The water-salinity sensor 162 is configured to detect the salinity levels. The water-salinity sensor 162 is affixed to the front-bottom region of the floating body 130 to enable submerged environmental sampling. In one embodiment herein, the water-salinity sensor 162 is a toroidal conductivity salinity meter partially immersed in water.

In one embodiment herein, the optical fluorescence-sensing unit 164 is integrated on the supporting frame 140. The optical fluorescence-sensing unit 164 is a Fluorescence LiDAR (Laser Induced Detection and Ranging). The optical fluorescence-sensing unit 164 is configured to detect the algae volume and vitality on the water surface. In one embodiment herein, the optical fluorescence-sensing unit 164 comprises a laser source 164A, a beam steering unit 164B, a fluorescence detector 164C, a spectral filter 164D, and a timing and ranging module 164E. In one embodiment herein, the laser source 164A emits a specific wavelength (typically 450-532 nm) of light to excite the algae pigments (like chlorophyll-a). The intensity and spread of the laser help in measuring algae volume over the water surface.

In one embodiment herein, the beam steering unit 164B controls the angle and direction of the laser beam for accurate scanning over the water surface and facilitates non-contact measurement of algae distribution and depth, essential for comprehensive volume estimation.

In one embodiment herein, the fluorescence detector 164C detects the fluorescent light emitted by algae after excitation. The fluorescence intensity directly correlates with algae concentration (volume). It differentiates live and dead algae by analyzing fluorescence patterns, as live algae exhibit stronger fluorescence due to active pigments.

In one embodiment herein, the spectral filter 164D filters out background light (like sunlight) and reflected laser signals, allowing only fluorescent signals from algae to reach the detector to accurately detect the algae without interference. In one embodiment herein, the timing and ranging module 164E measures the time delay between the emitted laser pulse and the received fluorescent signal. Based on this data, it calculates the distance and depth profile of the algae layers and estimates the algae volume on the water surface. In one embodiment herein, Table 3 depicts specifications of the AI imaging unit 160, the water-salinity sensor 162, and the optical fluorescence-sensing unit 164.

TABLE 3

| Subsystem | Parameter | Target/Recommended spec | Why/Notes | Interface & Power |
| --- | --- | --- | --- | --- |
| Salinity meter | Measurement principle | Toroidal/inductive conductivity with integrated temperature | Resists fouling; stable in debris-rich water | RS-485 (Modbus-RTU), 12-24 V DC, <60 mA |
| | Salinity/ EC range | 0-60 mS/cm (≈0-40 ppt salinity) | Covers freshwater → marine | — |
| | Accuracy/ resolution | ±0.2 ppt (or ±1% rdg), 0.01 ppt | For thresholding and trend logging | — |
| | Temp compensation | Auto 0-50° C. (NTC-10k or PT1000) | Corrects EC → ppt conversion | — |
| | Response time | T90 ≤2 s | Real-time control friendly | — |
| | Materials/ rating | PVDF/PEEK body, IP68, 0-3 bar | Durable, sub-surface mounting | — |
| | Calibration | 1-3-point (field), cell-constant stored | Easy maintenance | — |
| | Mounting depth | 150-250 mm below surface with guard | Avoids surface film / bubbles | — |
| | Cable/EMC | ≥5 m shielded, IP68 gland | Noise immunity | — |
| | Algorithm | PSS-78 (Practical Salinity Scale) | Standardized ppt output | — |
| AI imaging unit | Sensor & format | 8-12 MP, $\frac{1}{2.3}$"-$\frac{1}{1.8}$" CMOS | Balance FOV + detail | MIPI CSI-2 (2-4 lanes), 5 V ≤1 W |
| | Shutter | Global preferred (rolling acceptable with short exposure) | Reduces motion artifacts on a moving craft | CSI ribbon to SBC |
| | Frame rate | 30 fps @ full res; 60 fps binned | Smooth tracking | — |

TABLE 3-continued

| Subsystem | Parameter | Target/Recommended spec | Why/Notes | Interface & Power |
|---|---|---|---|---|
| | Optics/FOV | M12 or CS-mount, f/2.0-2.8; HFOV 78-120° | Wide coverage with low distortion | — |
| | HDR/low-light | WDR ≥90 dB, SNR1 ≤0.1 lux | Dawn/dusk performance | — |
| | ISP features | AE/AGC/AWB; de-noising; lens shading | Stable inference inputs | — |
| | Sync & time | PPS/GPIO or PTP/NTP (preferred) | Aligns with LiDAR timestamps | — |
| | Protection | Splash shroud, hydrophobic lens coating, IP65 front | Outdoor reliability | — |
| | Edge inference | MobileNetV3-Large INT8: 25-35 FPS on Jetson Orin Nano | Meets real-time needs | SBC 5 V rail (≥5 A total) |
| Fluorescence LiDAR | Excitation wavelength | 520 nm (green) (alt: 450-532 nm) | Excites chlorophyll-a | GbE (UDP/PTP), 24 V DC, 10-15 W |
| | Laser safety | IEC 60825-1 Class 1 | Eye-safe deck operation | — |
| | Pulse width/ timing | 5-20 ns pulses; ≤10 ns timing resolution; jitter ≤1 ns | Lifetime/decay features | — |
| | Receiver band | 650-750 nm (chlorophyll-a emission) with narrow band-pass | Ambient light immunity | — |
| | Range/ footprint | 0.5-6 m effective over water; spot ≤20-50 mm at 3 m | Bow-mounted scanning | — |
| | Scan/point rate | FOV 30° × 15°, 5-20 Hz scan, ≥10k pts/s | Dense surface mapping | — |
| | Outputs | Range, intensity, fluorescence decay/ lifetime per point | Volume + vitality (live/dead) | GbE to SBC |
| | Sunlight rejection | Works to ≥100 klux with optical band-pass + temporal gating | Midday operation | — |
| | IP/ environment | IP67, −10 to +50° C., <1.5 kg | Marine-ready | 24 V from 48→24 V DC-DC |
| | Time sync | IEEE-1588 PTP or PPS input | Align with camera frames | — |
| | Compliance | EMC/ESD marine/industrial | Reduces interference | — |

40

In one embodiment herein, the controller 172 is securely housed within the hollow section of the floating body 130. The controller 172 is operatively connected to the one or more motors (134A, 134B, 134C, 134D) to control the operation of the plurality of propelling wheels (132A, 132B, 132C, 132D). The controller 172 is operatively connected to the driving unit 142 to control the operation of the inclined conveyor belt 152 for collecting the organic waste 12 and the recyclable waste 14. The controller 172 is configured to communicate with the AI imaging unit 160, the water-salinity sensor 162, the optical fluorescence-sensing unit 164 and the navigation unit 168 for controlling operation of the AI-based autonomous system 100.

In one embodiment herein, the controller 172 utilizes Regression Analysis, Point Cloud Processing, and the Kal-man Filter models to estimate algae volume by analysing fluorescence intensity data collected by the LiDAR. Additionally, the controller 172 incorporates advanced models such as Support Vector Machine (SVM), Clustering models (e.g., K-Means, DBSCAN), and Time-Series Analysis (LSTM Networks) to accurately differentiate between live and dead algae by examining fluorescence decay patterns. The controller 172 is pre-programmed with fluorescence decay pattern data to accurately determine algae vitality. In one embodiment herein, the controller 172 uses Fuzzy Logic and Random Forest Classifier models to predict need for algae removal by comparing detected algae parameters such as algae type, volume, water salinity, and vitality.

In one embodiment herein, Table 4 depicts pin to pin configuration of the controller 172, which can be, but is not limited to, NVIDIA Jetson Grin Nano (8 GB).

TABLE 4

| ID | Controller | Pin/Header (AF) | Signal | To device/ port | Interface | Direction | Voltage | Notes (timing/ termination) |
|---|---|---|---|---|---|---|---|---|
| 1 | MCU | PA9 (AF7) | USART1_TX | SBC UART RX (header pin 10) | UART | → | 3.3 V | SBC link; 460.8-921.6 kbps |
| 2 | MCU | PA10 (AF7) | USART1_RX | SBC UART TX (header pin 8) | UART | ← | 3.3 V | Cross TX/RX; common GND |

TABLE 4-continued

| ID | Controller | Pin/Header (AF) | Signal | To device/port | Interface | Direction | Voltage | Notes (timing/termination) |
|---|---|---|---|---|---|---|---|---|
| 3 | SBC | Pin 6 | GND | MCU GND | — | ↔ | 0 V | Single-point (star) ground |
| 4 | MCU | PD8 (AF7) | USART3_TX/DI | RS-485 transceiver DI → Probe A/B | RS-485 | → | 3.3 V | MODBUS-RTU 115200 bps |
| 5 | MCU | PD9 (AF7) | USART3_RX/RO | RS-485 transceiver RO ← Probe A/B | RS-485 | ← | 3.3 V | 120 Ω termination at far end |
| 6 | MCU | PD2 (GPIO) | DE/RE | RS-485 transceiver enable | RS-485 ctrl | → | 3.3 V | High = TX, Low = RX |
| 7 | MCU | PD1 (AF9) | FDCAN1_TX | CAN transceiver → CAN bus | CAN-FD | → | 3.3 V | Optional; 120 Ω end |
| 8 | MCU | PD0 (AF9) | FDCAN1_RX | CAN transceiver ← CAN bus | CAN-FD | ← | 3.3 V | Optional |
| 9 | MCU | PC6 (AF2/TIM3_CH1) | PWM | Thruster-L ESC signal | PWM | → | 3.3 V | 400 Hz; 1.0-2.0 ms |
| 10 | MCU | PC7 (AF2/TIM3_CH2) | PWM | Thruster-R ESC signal | PWM | → | 3.3 V | 400 Hz; 1.0-2.0 ms |
| 11 | MCU | PA15 (AF1/TIM2_CH1) | PWM | Conveyor ESC signal | PWM | → | 3.3 V | 400 Hz; 1.0-2.0 ms |
| 12 | MCU | PB0 (AF2/TIM3_CH3) | PWM | Pan servo | PWM | → | 3.3 V | 50 Hz; 1.0-2.0 ms |
| 13 | MCU | PB1 (AF2/TIM3_CH4) | PWM | Tilt servo | PWM | → | 3.3 V | 50 Hz; 1.0-2.0 ms |
| 14 | MCU | PB8 (AF4) | I$^2$C1_SCL | 9-axis IMU SCL | I$^2$C | ↔ | 3.3 V | 400 kHz; 4.7 kΩ pull-up |
| 15 | MCU | PB9 (AF4) | I$^2$C1_SDA | 9-axis IMU SDA | I$^2$C | ↔ | 3.3 V | 400 kHz; 4.7 kΩ pull-up |
| 16 | MCU | PA0 (ADC1_IN0) | Batt-V sense | Divider from 48 V | ADC | ← | 0-3.3 V | 100k/3.3k + 10 nF RC |
| 19 | MCU | PA1 (ADC1_IN1) | Batt current | Hall sensor output | ADC | ← | 0-3.3 V | Isolated shunt module |
| 17 | MCU | PC13 (GPIO, PU) | E-Stop input | NC loop (via opto) | Digital | ← | 3.3 V | Fail-safe HIGH; INT on edge |
| 18 | MCU | PC1 (GPIO) | Bin-full | IR/reflective sensor | Digital | ← | 3.3 V | Debounce (SW) |
| 19 | MCU | PB12 (GPIO) | Conveyor limit/jam | Limit switch | Digital | ← | 3.3 V | Interrupt, pull-up |
| 20 | SBC | CSI-2 port | MIPI CSI-2 | AI imaging unit | CSI-2 | ↔ | — | 15/22-pin FFC |
| 21 | Field Pwr | — | +24 V/0 V | Salinity probe | Power | → | 24 V | From 48→24 V DC-DC |
| 22 | SBC Pwr | — | +5 V/0 V | SBC main rail | Power | → | 5 V | 24→5 V, ≥5 A |
| 23 | MCU Pwr | — | +3.3 V/0 V | MCU & IMU | Power | → | 3.3 V | LDO from 5 V, star AGND |

In one embodiment herein, the primary power source 166A is securely housed within the hollow section of the floating body 130 to supply electrical power to the controller 172 and the one or more motors (134A, 134B, 134C, 134D). In one embodiment herein, the secondary power source 166B is positioned on the supporting frame 140 supply the electrical power to the AI imaging unit 160, the water-salinity sensor 162, the optical fluorescence-sensing unit 164, and the navigation unit 168. In one embodiment herein, the navigation unit 168 is securely housed within the hollow section of the floating body 130 to navigate the autonomous water-cleaning vehicle 128. In one embodiment herein, Table 5 depicts specifications of the primary power source 166A and the secondary power source 166B.

TABLE 5

| Parameter | Primary power source (Wheels & Controller) | Secondary power source (AI imaging unit & LiDAR) |
|---|---|---|
| Type | Lithium-ion (Li-ion) | Lithium Polymer (Li-Po) |
| Voltage | 48 V | 24 V |
| Capacity | 100 Ah (for 6-8 hours runtime) | 50 Ah (continuous LiDAR and sensors) |
| Energy Density | High (>250 Wh/kg) | Very High (>300 Wh/kg) |
| Protection | BMS with thermal management | BMS with overcharge protection |
| Waterproof Rating | IP67 | IP65 |

In one embodiment herein, the controller 172 includes the oT-based communication modules 174 to enable real-time monitoring, control, and data transmission. The IoT-based communication modules 174 enable wireless communication between the user device 125 and the controller 172. In one embodiment herein, the IoT-based communication modules 174 enable wireless communication ofthe controller 172 with the AI imaging unit 160, the water-salinity sensor 162, the optical fluorescence-sensing unit 164, and the navigation unit 168.

In one embodiment herein, Table 6 depicts specifications of the IoT-based communication modules 174.

TABLE 6

| Requirement | Communication Module | Reason |
|---|---|---|
| Short-range communication (≤10 m) | Bluetooth (HC-05/HM-10) | Low power consumption, suitable for app-based direct control. |

TABLE 6-continued

| Requirement | Communication Module | Reason |
|---|---|---|
| Mid-range (100 m-500 m) | Wi-Fi (ESP32/ESP8266) | Supports cloud connectivity, OTA updates, and real-time data streaming. |
| Long-range communication (several km) | LoRa (RAK3172/SX1276) | Suitable for remote areas without internet, low power consumption. |
| Cellular connectivity | NB-IoT (SIM7000)/ 4G LTE (SIM7600) | Works in areas without Wi-Fi, reliable for continuous data transmission. |

In one embodiment herein, Table 7 depicts the IoT-based communication modules 174 that enable wireless communication of the controller 172 with the AI imaging unit 160.

TABLE 7

| Communication Module | Type | Data Transfer Rate | Range | Latency | Power Consumption | Key Advantages |
|---|---|---|---|---|---|---|
| Wi-Fi (802.11ac/ax) | Wireless | Up to 9.6 Gbps (Wi-Fi 6) | 30-100 m | Low to Moderate | Moderate | High-speed, supports video streaming & AI processing |
| Bluetooth 5.0/5.2 | Wireless | Up to 2 Mbps | 10-100 m | Low | Low | Energy-efficient, suitable for low-bandwidth AI tasks |
| Zigbee (IEEE 802.15.4) | Wireless | 250 Kbps | 10-100 m | Low | Very Low | Low-power consumption, ideal for IoT applications |
| LoRa (Long Range) | Wireless | 0.3-50 Kbps | 2-10 km | High | Very Low | Suitable for long-range communication in remote water bodies |
| 5G (NR mm Wave & Sub-6 GHz) | Wireless | Up to 10 Gbps | Several km (depends on infrastructure) | Very Low | Moderate | Best for real-time AI-based water analysis & cloud integration |
| Li-Fi (Light Fidelity) | Wireless (Optical) | Up to 1 Gbps | 10 m (Line of Sight) | Very Low | Low | Ultra-fast communication using light signals, immune to RF interference |
| RF Transceiver (433 MHz/ 915 MHz) | Wireless | 1-100 Kbps | 100 m-1 km | Low | Low | Reliable, operates in non-Wi-Fi congested bands |
| Ethernet (LAN, RJ45) | Wired | Up to 1 Gbps | N/A (Physical cable) | Very Low | Moderate | Reliable, stable, ideal for fixed monitoring stations |
| CAN Bus (Controller Area Network) | Wired | 1 Mbps | Up to 40 m | Low | Low | Efficient, used in industrial automation |
| I2C (Inter-Integrated Circuit) | Wired | Up to 3.4 Mbps | Short-range (1 m) | Very Low | Low | Suitable for on-board AI imaging unit-controller communication |
| UART (Universal Asynchronous Receiver-Transmitter) | Wired | 115 Kbps-1 Mbps | Short-range (1-2 m) | Low | Low | Simple, widely used in embedded systems |
| SPI (Serial Peripheral Interface) | Wired | Up to 10 Mbps | Short-range (PCB level) | Very Low | Low | High-speed short-distance communication |

In one embodiment herein, Table 8 depicts the IoT-based communication modules 174 that enable wireless communication of the controller 172 with the optical fluorescence-sensing unit 164.

TABLE 8

| Communication Module | Type | Data Transfer Rate | Range | Latency | Power Consumption | Key Advantages |
|---|---|---|---|---|---|---|
| Ethernet (LAN, RJ45 - Gigabit) | Wired | Up to 1 Gbps | N/A (Physical cable) | Very Low | Moderate | High-speed, reliable, ideal for real-time data processing |
| Fiber Optic (Optical Communication) | Wired | Up to 100 Gbps | Long-range (10+ km) | Very Low | Low | Ultra-fast, low interference, ideal for high-precision LIDAR data |
| CAN Bus (Controller Area Network) | Wired | 1 Mbps | Up to 40 m | Low | Low | Reliable for industrial automation, suitable for short-range LIDAR control |
| RS-485/RS-232 (Serial Communication) | Wired | Up to 10 Mbps | 1.2 km (RS-485) | Low | Low | Simple and effective for industrial applications |
| Wi-Fi (802.11ac/ax) | Wireless | Up to 9.6 Gbps (Wi-Fi 6) | 30-100 m | Low to Moderate | Moderate | High-speed, good for wireless LIDAR applications |
| 5G (NR mmWave & Sub-6 GHz) | Wireless | Up to 10 Gbps | Several km | Very Low | Moderate | Best for real-time LIDAR data transmission & cloud integration |
| LoRa (Long Range) | Wireless | 0.3-50 Kbps | 2-10 km | High | Very Low | Suitable for remote environmental monitoring applications |
| Zigbee (IEEE 802.15.4) | Wireless | 250 Kbps | 10-100 m | Low | Very Low | Low-power, suitable for networked sensor communication |
| Li-Fi (Light Fidelity) | Wireless (Optical) | Up to 1 Gbps | 10 m (Line of Sight) | Very Low | Low | Ultra-fast communication using light, immune to RF interference |
| SPI (Serial Peripheral Interface) | Wired | Up to 10 Mbps | Short-range (PCB level) | Very Low | Low | High-speed, suitable for embedded LIDAR processing |
| I2C (Inter-Integrated Circuit) | Wired | Up to 3.4 Mbps | Short-range (1 m) | Very Low | Low | Efficient for internal sensor-controller communication |

In one embodiment herein, Table 9 depicts the wireless communication between the controller 172 and the one or more motors (134A, 134B, 134C, 134D).

TABLE 9

| Motor Type | Recommended Module | Protocol Used | Reason |
|---|---|---|---|
| DC Propelling Motors | Motor Driver (L298N/ BTS7960/VNH2SP30) | PWM (Pulse Width Modulation) + UART | Controls motor speed and direction. |

In one embodiment herein, Table 10 depicts the wireless communication between the controller 172 and the navigation unit 168.

TABLE 10

| Requirement | Recommended Module | Protocol Used | Reason |
|---|---|---|---|
| GPS Tracking | NEO-6M/SIM808 GPS Module | UART/I2C/SPI | Provides real-time location tracking for navigation. |
| Data Transfer to Controller | ESP32/Raspberry Pi | UART/I2C | Sends GPS coordinates for path optimization. |

Figure 3:
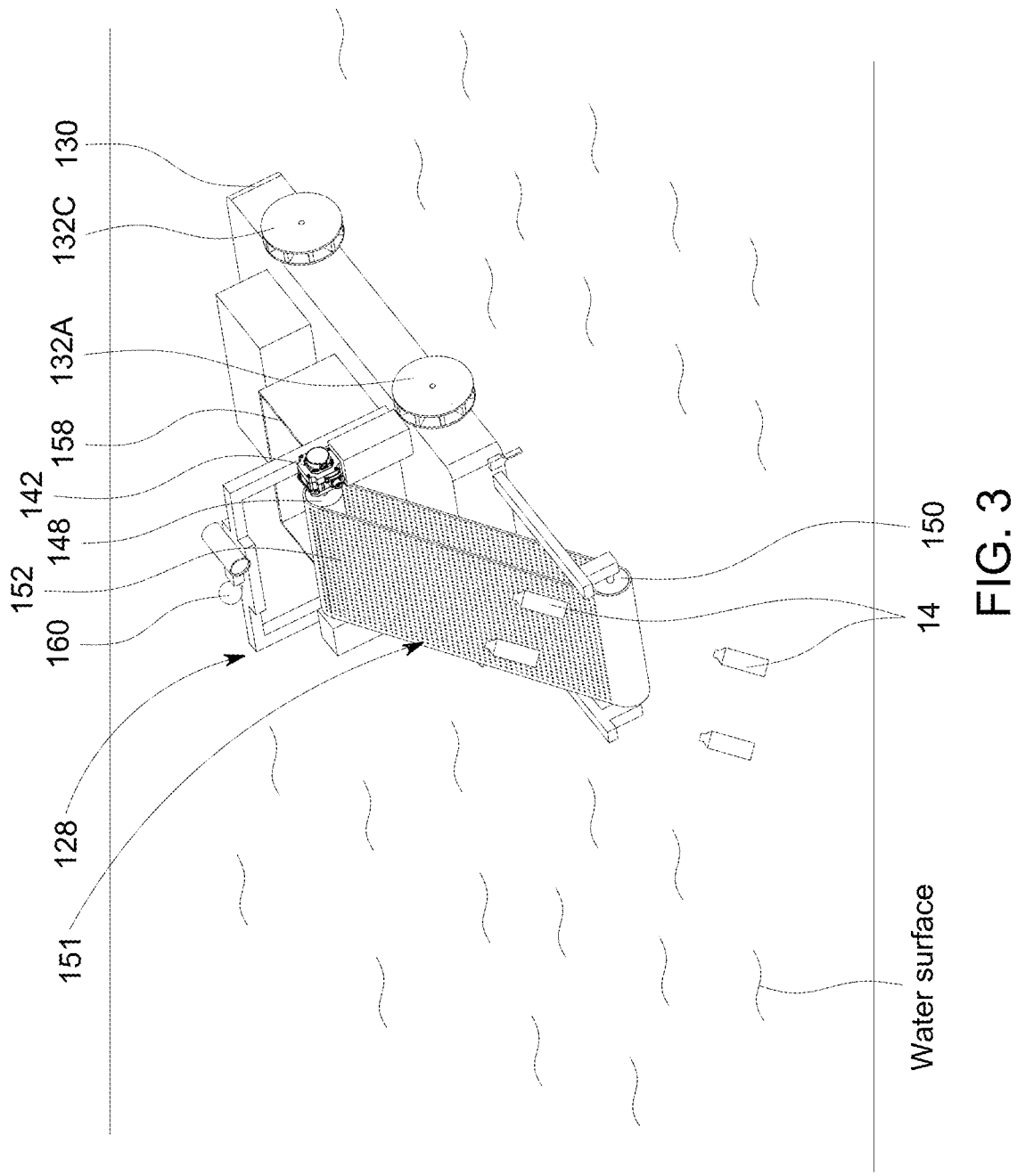
FIG. 3 illustrates a schematic view of the autonomous water-cleaning vehicle while predicting and removing recyclable waste in water bodies, in accordance with embodiments of the invention.

FIG. 3 refers to a schematic view of the autonomous water-cleaning vehicle 128 while predicting and removing recyclable waste 14 in water bodies. In one embodiment herein, the autonomous water-cleaning vehicle 128 is designed to autonomously detect, navigate toward, and collect recyclable waste 14 while avoiding obstacles in the water. The AI-based autonomous system 100 operates through a sequence of controlled steps to ensure efficient waste removal. In one embodiment herein, the operation of the autonomous water-cleaning vehicle 128 begins with the user linking the vehicle to the user device 125 via the network 120.

Once connected, the user places the autonomous water-cleaning vehicle 128 on the water surface requiring cleaning. In this position, the front end of the inclined conveyor belt 152 is submerged to facilitate waste collection, while the propelling wheels (132A, 132B, 132C, 132D) remain partially immersed to enable movement. The user then activates the autonomous water-cleaning vehicle 128 by pressing the "start" button on the user interface 126 of the user device 125, initiating the controller 172, which powers the propelling wheel motors (134A, 134B, 134C, 134D) and the driving unit 142.

In one embodiment herein, once activated, the autonomous water-cleaning vehicle 128 moves across the water surface, driven by the rotation of the plurality of propelling wheels (132A, 132B, 132C, 132D). Simultaneously, the driving unit 142 rotates, which in turn rotates the first roller 148. This rotation drives the inclined conveyor belt 152, while the second roller 150 rotates passively to support the belt's movement. The inclined conveyor belt 152 continuously collects recyclable waste 14 from the water surface and transfers it toward the container 158.

In one embodiment herein, the autonomous water-cleaning vehicle 128 employs an AI-powered waste direction monitoring system. The AI imaging unit 160 scans the water surface in all directions using its 360-degree rotating capability. As it monitors the surroundings, the AI imaging unit 160 detects recyclable waste 14 and compares the captured image data with pre-programmed waste patterns stored in its system. If the detected waste matches the pre-defined data, the AI imaging unit 160 transmits this information to the controller 172 for processing.

In one embodiment herein, upon receiving data from the AI imaging unit 160, the controller 172 determines the most efficient movement path for recyclable waste 14 collection. For instance, if the AI imaging unit 160 detects recyclable waste 14 on the right side of the autonomous water-cleaning vehicle 128, it sends a signal to the controller 172. In response, the controller 172 adjusts the speed of the plurality of propelling wheels (132A, 132B, 132C, 132D) by accelerating the second wheel 132B and the fourth wheel 132D while decelerating the first wheel 132A and the third wheel

132C, thereby causing the autonomous water-cleaning vehicle 128 to steer toward the right to collect the recyclable waste 14 effectively. The AI-based autonomous system 100 ensures that the autonomous water-cleaning vehicle 128 automatically adapts its direction based on the distribution of recyclable waste 14 in the water. Additionally, if the AI imaging unit 160 detects obstacles, such as a wall surface, the controller 172 processes this information and adjusts the vehicle's movement accordingly. The controller 172 directs the vehicle to navigate away from the obstacle, preventing potential collisions and ensuring operational longevity and functionality by modifying its direction and adjusting the propelling speed.

In one embodiment herein, the AI-based autonomous system 100 provides an advanced and autonomous solution for predicting, detecting, and removing recyclable waste 14 from water bodies. By integrating AI-powered navigation, automated waste collection, and real-time obstacle avoidance, the autonomous water-cleaning vehicle 128 enhances the efficiency of water body maintenance while minimizing manual intervention.

FIG. 4 refers to a schematic view of the autonomous water-cleaning vehicle 128 while predicting and removing organic waste 12 in water bodies. The autonomous water-cleaning vehicle 128 is designed to detect, classify, and determine the appropriate removal of organic waste 12 using advanced AI-powered image processing, fluorescence LiDAR, and salinity-based analysis.

In one embodiment herein, the AI imaging unit 160, positioned above the container 158, captures images of organic waste 12 present on the water surface. The AI imaging unit 160 compares the captured images with a dataset of images representing green algae (Chlorophyta), diatoms (Bacillariophyta), red algae (Rhodophyta), blue-green algae (Cyanobacteria), dinoflagellates (Dinophyta), and golden algae (Chrysophyta) to classify the organic waste 12 into ecologically beneficial and ecologically harmful types, enabling precise identification and classification. Once classified, the AI imaging unit 160 transmits the organic waste type data to the controller 172 for further analysis. Upon receiving the data, the controller 172 activates the optical fluorescence-sensing unit 164 and the water-salinity sensor 162 to assess organic waste removal feasibility.

In one embodiment herein, the AI-based autonomous system 100 employs a fluorescence LiDAR-based vitality detection mechanism. The laser source 164A of the optical fluorescence-sensing unit 164 emits a laser beam onto the detected organic waste 12 to excite its pigments. In response, the organic waste 12 emits fluorescence signals, which are captured by the fluorescence detector 164C. The fluorescence intensity and decay pattern data are transferred to the controller 172 for analysis. The controller 172 utilizes a machine learning model comprises support vector machine (SVM), k-means clustering, DBSCAN clustering, or long short-term memory (LSTM) networks to analyze the fluorescence decay patterns and differentiate between live and dead organic waste. the AI-based autonomous system 100 determines that organic waste 12 is alive if the fluorescence decay pattern exhibits longer decay times and higher intensity, whereas shorter decay times and lower intensity indicate dead organic waste.

In one embodiment herein, the controller 172 computes the volume of the organic waste 12 by processing fluorescence intensity data along with the time delay between the emitted laser pulse and the detected fluorescence signal, which is provided by the timing and ranging module 164E. The controller 172 employs point-cloud reconstruction techniques, which can be, but is not limited to, regression analysis, point cloud processing, and Kalman filter models to estimate the total organic waste volume. Additionally, the controller 172 integrates data from the water-salinity sensor 162 and compares the detected organic waste volume with water salinity levels to assess whether the organic waste concentration exceeds salinity-dependent ecological threshold values stored in the non-transitory memory 176.

In one embodiment herein, the controller 172 determines the appropriate action for organic waste removal based on multiple parameters, including organic waste type, volume, vitality, and water salinity levels. The decision-making process is governed by a decision model comprising fuzzy logic and random forest classifier models. If the organic waste 12 is beneficial, alive, and the detected volume is below the salinity-dependent threshold, the controller 172 refrains from removal and commands the navigation unit 168 to redirect the autonomous water-cleaning vehicle 128 away from the organic waste region by adjusting the propelling wheels. However, if the detected organic waste volume exceeds the threshold, or if the organic waste is identified as harmful or dead, the controller 172 initiates the removal process by activating the conveyor unit 151.

In one embodiment herein, the AI-based autonomous system 100 provides an intelligent, data-driven approach for detecting, analyzing, and selectively removing harmful organic waste 12 from water bodies. By integrating Aw-powered image recognition, fluorescence LiDAR-based vitality detection, salinity-based volume estimation, and machine learning-based decision model, the autonomous water-cleaning vehicle 128 ensures efficient and environmentally responsible organic waste management.

Table 11 depicts dimensions of the components of the autonomous water-cleaning vehicle 128.

TABLE 11

| Component | Dimension (L × W × H) (cm) | Description |
|---|---|---|
| Overall Dimensions | 80 × 30 × 25 | Total size of the device, ensuring stability and optimal waste collection. |
| Floating body | 40 × 25 × 10 | Rectangular, hollow structure with curved corners for stability and movement on water. |
| Propelling Wheels | Diameter: 5 cm | Waterproof, high-torque wheels for smooth navigation. |
| Waste Collection Conveyor | 100 × 40 × 20 | Inclined conveyor for efficient floating waste collection. |
| First Roller | Length: 30 cm, Ø 4 cm | Supports inclined conveyor belt movement. |
| Second Roller | Length: 30 cm, Ø 4 cm | Guides belt for waste transport. |
| Inclined conveyor belt | 70 × 30 | Perforated design for water drainage during waste collection. |
| Container | 25 × 20 × 20 | Stores collected floating waste. |
| Supporting frame | 15 × 15 × 12 | Provides structural support for AI imaging unit and Fluorescence LiDAR. |

In one embodiment herein, Table 12 depicts training data of the AI imaging unit 160.

TABLE 12

| Category | Data to Train | Purpose |
|---|---|---|
| Floating Plastic Waste | Plastic bottles, bags, wrappers | Detect and direct device toward plastic waste. |
| Floating Paper Waste | Cardboard, newspapers, cups | Identify and direct toward paper-based waste. |
| Organic Floating Waste | Leaves, wood debris, algae patches | Recognize organic waste presence. |
| Water Surface | Clean water, ripples, disturbed water | Distinguish waste from normal water patterns. |
| Obstacle Identification | Walls, rocks, buoys, boats | Detect and avoid collisions. |
| Floating Animals | Fish, birds, amphibians | Prevent harm to aquatic life. |

In one embodiment herein, Table 13 depicts data related to the algae 12.

TABLE 13

| Algae Category | Algae Type | Examples | Key Visual Characteristics | Ecological Impact |
|---|---|---|---|---|
| Useful Algae | Green Algae (Chlorophyta) | Chlorella, Spirogyra | Bright green; filamentous; smooth, uniform appearance | Oxygen production; supports aquatic food chain |

TABLE 13-continued

| Algae Category | Algae Type | Examples | Key Visual Characteristics | Ecological Impact |
|---|---|---|---|---|
| | Diatoms (Bacillariophyta) | Navicula, Cyclotella | Brownish-green; intricate silica-based patterns | Primary producers; water quality indicators |
| | Red Algae (Rhodophyta) | Polysiphonia | Deep red to purple; branching structures | Habitat stabilization; ecosystem enhancement |
| Harmful Algae | Blue-Green Algae (Cyanobacteria) | Microcystis, Anabaena | Blue-green; scum-like; sometimes mucilaginous | Toxin production; cause harmful algal blooms |
| | Dinoflagellates | Alexandrium | Irregular shapes; may exhibit bioluminescence; red tides | Disrupt marine life; produce toxins |
| | Golden Algae | Prymnesium parvum | Golden-yellow; chain-forming; dense bloom formations | Produces fish-killing toxins; detrimental effects |

In one embodiment herein, Table 14 depicts fluorescence decay patterns, intensity and decay time data (stored in database 124).

TABLE 14

| Algae Type | Vitality Status | Fluorescence Intensity | Decay Time (nanoseconds) | Fluorescence Pattern Characteristics | Interpretation |
|---|---|---|---|---|---|
| Green Algae (Chlorophyta) | Alive | High | 650-800 | Strong peak intensity; gradual decay curve | Active photosynthesis; healthy |
| Green Algae (Chlorophyta) | Dead | Low or None | <400 | Weak or absent peaks; rapid decay | Chlorophyll degradation; inactive |
| Diatoms (Bacillariophyta) | Alive | Moderate to High | 700-850 | Sustained fluorescence; steady decline | Functioning primary producer |
| Diatoms (Bacillariophyta) | Dead | Low | <450 | Minimal intensity; fast decay | Photosynthetic inactivity |
| Red Algae (Rhodophyta) | Alive | High | 800-950 | Prolonged fluorescence decay; consistent signal | Ecosystem-stable; healthy |
| Red Algae (Rhodophyta) | Dead | Low or None | <500 | Rapid decay; no sustained fluorescence | Inactive; loss of pigmentation |
| Blue-Green Algae (Cyanobacteria) | Alive | Very High | 850-1000 | Intense peak; slow decay (due to gas vesicles) | Active toxin producers (harmful) |
| Blue-Green Algae (Cyanobacteria) | Dead | Very Low | <400 | Weak/no signal; rapid decay | Non-toxic; non-photosynthetic |
| Dinoflagellates | Alive | High | 900-1100 | Long decay time; high-intensity bursts (bioluminescence in some cases) | Active toxin production (harmful) |
| Dinoflagellates | Dead | Minimal | <500 | Abrupt decay; low baseline intensity | Inactive; no toxin production |
| Golden Algae (Chrysophyta) | Alive | Moderate | 700-900 | Moderate peaks; steady fluorescence drop | Active; potential toxin production |
| Golden Algae (Chrysophyta) | Dead | Low | <450 | Quick decay; diminished fluorescence | Inactive; no ecological threat |

In one embodiment herein, Table 15 depicts algae volume and water salinity threshold.

TABLE 15

| Water Salinity (ppt) | Water Type | Typical Algae Volume Threshold ($g/m^3$) | Ecological Impact (If Within Threshold) | Risk Level (If Exceeded) | Recommended Action |
|---|---|---|---|---|---|
| <0.5 ppt | Freshwater (Rivers, Lakes) | 10-30 | Balanced oxygen levels, supports aquatic biodiversity | High risk of eutrophication and oxygen depletion | Remove excess algae; monitor water quality |
| 0.5-5 ppt | Brackish (Estuaries) | 30-50 | Supports diverse ecosystems; moderate algae presence beneficial | Moderate risk of harmful algal blooms (HABs) | Remove algae if near upper threshold; monitor vitality |
| 5-18 ppt | Slightly Saline | 50-100 | Algae supports aquatic life; oxygen production optimal | Potential disruption in food chains; harmful blooms | Remove if the volume exceeds 80 $g/m^3$; check algae type |
| 18-30 ppt | Moderately Saline | 100-200 | Stable ecosystems with robust algae populations | High risk of toxic blooms (e.g., cyanobacteria) | Remove algae exceeding 150 $g/m^3$; assess toxicity |
| 30-35 ppt | Marine (Ocean, Seas) | 200-500 | Algae essential for marine productivity; supports fisheries | Significant risk of red tides and marine life toxicity | Immediate removal if >400 $g/m^3$; activate emergency protocols |
| >35 ppt | Hypersaline (Salt Lakes) | 500+ | Specialized algae thrive; balanced micro-ecosystems | Potential for dense harmful blooms; oxygen depletion | Remove algae exceeding 600 $g/m^3$; intensive monitoring required |

In one embodiment herein, Table 16 depicts wheel rotations for direction control.

TABLE 16

| Floating Waste Position | Left-Side Wheels (Motor Speed-RPM) | Right-Side Wheels (Motor Speed-RPM) | Device Movement Direction |
|---|---|---|---|
| Directly Ahead | 50 RPM (Forward) | 50 RPM (Forward) | Moves Straight |
| Slightly Right | 50 RPM (Forward) | 30 RPM (Forward) | Turns Slightly Right |
| Far Right | 70 RPM (Forward) | 0 RPM (Stopped)/ −30 RPM (Reverse) | Turns Sharply Right |
| Slightly Left | 30 RPM (Forward) | 50 RPM (Forward) | Turns Slightly Left |
| Far Left | 0 RPM (Stopped)/ −30 RPM (Reverse) | 70 RPM (Forward) | Turns Sharply Left |
| Obstacle Detected | −40 RPM (Reverse) | −40 RPM (Reverse) | Moves Backward |

In one embodiment herein, Table 17 depicts multi-environment performance data of the AI-based autonomous system 100.

TABLE 17

| Exp ID | 1 | 2 | 3 | 4 | 5 | 6 | 7 |
|---|---|---|---|---|---|---|---|
| Water body (type) | Pond-A (fresh) | Reservoir-B (fresh) | Creek-C (brackish, flood) | Estuary-D (brackish, ebb) | Marina-E (marine, calm) | Harbor-F (marine, chop) | Urban Canal-G (fresh, turbid) |

TABLE 17-continued

| Exp ID | 1 | 2 | 3 | 4 | 5 | 6 | 7 |
|---|---|---|---|---|---|---|---|
| Salinity (ppt) | 0.3 | 0.4 | 1.2 | 3.2 | 32.1 | 33.5 | 0.7 |
| Conditions (klux/sea state) | 20 klux, calm | 85 klux, light chop | 60 klux, calm | 70 klux, breeze | 95 klux, calm | 100 klux, chop | 95 klux, turbid |
| Patches (n) | 156 | 156 | 140 | 147 | 122 | 123 | 132 |
| Volume Threshold V_thr (g/m$^3$) | 25 | 25 | 40 | 40 | 350 | 350 | 25 |
| Harmful Precision/ Recall | 0.93/0.92 | 0.91/0.90 | 0.90/0.89 | 0.89/0.88 | 0.94/0.91 | 0.92/0.89 | 0.90/0.87 |
| Useful false-removal | 0.06 | 0.08 | 0.08 | 0.09 | 0.07 | 0.09 | 0.1 |
| Volume RMSE/Bias | 10.1%/+2.8% | 11.0%/+3.6% | 11.3%/+2.5% | 11.8%/+2.1% | 11.0%/+1.9% | 11.6%/+2.0% | 12.3%/+4.2% |
| Vitality F1 | 0.92 | 0.9 | 0.9 | 0.9 | 0.93 | 0.91 | 0.89 |
| LiDAR noon valid (% of dawn) | 100 | 91 | 93 | 88 | 90 | 86 | 84 |
| ΔDO after harvest (mg/L) | 0.2 | 0.2 | 0.3 | 0.3 | 0.4 | 0.3 | 0.2 |
| Energy (Wh/h) | 255 | 270 | 275 | 285 | 298 | 310 | 290 |

Here, Salinity (ppt) is considered as the salt level present in the water. Conditions (klux/sea state) are considered as the sunlight intensity measured in thousand lux and the surface-water state and chop level. Patches (n) are considered as the count of distinct surface clusters evaluated by the AI-based autonomous system. V_thr (g/m$^3$) is considered as the salinity-adapted biomass threshold used for determining whether algae should be harvested.

Here, Harmful Precision/Recall refers to the accuracy metrics for harmful-algae removal. The precision represents the proportion of correctly removed harmful algae, and the recall represents the proportion of total harmful algae successfully removed. Useful false-removal represents the fraction of beneficial and live algae that are incorrectly removed.

Here, Volume RMSE/Bias represents the error percentage of the fluorescence-LiDAR biomass estimate when compared to laboratory measurements, including the average over-estimation and under-estimation; an RMSE of approximately 12% or lower and a near-zero bias indicates an accurate and unbiased volume measurement.

Here, Vitality F1 represents the classifier performance score for distinguishing between live and dead algae, computed as the harmonic mean of vitality-classification precision and recall. LiDAR noon valid (% of dawn) represents the percentage of valid LiDAR returns during mid-day operation relative to early-morning baseline conditions, where values above approximately 85-90% indicate effective glare resistance.

Here, ΔDO after harvest (mg/L) refers to the change in dissolved oxygen concentration near the water surface following a harvest pass of the autonomous water-cleaning vehicle.

In one embodiment herein, the AI-based autonomous system 100 is considered as an Aqua-Sense Harvester and is evaluated across seven different field sites, which can be, but is not limited to, freshwater ponds, reservoirs, urban canals, brackish estuaries, tidal creeks, and marine environments, with salinity ranging from 0.3 to 33.5 parts per thousand (ppt). A total of 976 surface patches are analyzed under varying illumination from 20 to 100 kilolux and surface conditions ranging from calm to choppy.

In one embodiment herein, the harmful-algae removal capability demonstrated a mean precision of approximately 0.91 and a mean recall of approximately 0.90 across the listed locations. The AI-based autonomous system 100 exhibited low false-removal rates of beneficial and live algae, averaging approximately 0.08 across all water bodies, thereby confirming its selective harvesting capability.

In one embodiment herein, the fluorescence-LiDAR-based algae-volume estimation produced a root-mean-square error of approximately 11.3% with an average bias of approximately +2.7% when compared with laboratory-validated biomass measurements. This demonstrates the high accuracy and low drift characteristics of the LiDAR-based estimation method implemented in the optical fluorescence-sensing unit.

In one embodiment herein, the vitality-detection subsystem achieved an average F1-score of approximately 0.91 for distinguishing between live and dead algae, indicating robust classification performance across freshwater, brackish, and marine salinity ranges.

In one embodiment herein, the optical fluorescence-sensing unit 164 demonstrated strong resistance to mid-day glare and wave-induced signal degradation. The mid-day LiDAR validity remained at approximately 90% of the dawn baseline for most field sites, with the lowest value (84%) observed under turbid and choppy conditions in the urban canal test. This performance confirms the suitability of the AI-based autonomous system for daytime algae-removal operations.

In one embodiment herein, the ecological impact assessment indicated a positive increase in dissolved oxygen levels following algae-harvest passes, with an average ADO of +0.27 mg/L across test sites and a maximum of +0.4 mg/L observed in marine environments.

This demonstrates the AI-based autonomous system's capability to mitigate hypoxia and improve near-surface water quality.

In one embodiment herein, the energy consumption of the autonomous water-cleaning vehicle averaged approximately 282 watt-hours per hour (Wh/h), with observed values ranging between 255 Wh/h and 310 Wh/h. Marine and choppy environments exhibited slightly higher energy consumption due to increased hydrodynamic resistance and navigation corrections.

In one embodiment herein, the experimental results confirm that the Aqua-Sense Harvester consistently removes harmful algae with high precision and recall, avoids unnecessary removal of beneficial biomass, maintains accurate biomass estimation through fluorescence-LiDAR analysis, operates robustly under varying illumination and water-surface conditions, and improves dissolved-oxygen levels in treated areas. These findings collectively demonstrate significant technical effects and performance advantages over conventional algae-removal systems.

In one embodiment herein, Table 18 depicts advantages of the AI-based autonomous system 100.

TABLE 18

| Area | Typical existing systems | Our system (Aqua-Sense) | Advantage / measurable benefit |
|---|---|---|---|
| Selectivity | Indiscriminate skimming of all biomass | Policy: type + volume + vitality + salinity | Wrong (useful) removals ↓ 20-40 pp |
| Harmful-algae removal | Manual/heuristic targeting | Fuzzy/ensemble decision rules | Correct harmful removals ↑ +10-20 pp |
| Vitality detection | None (color/reflectance only) | Time-resolved fluorescence (decay $\tau$, $A_1/A_2$) | Prioritizes dead biomass; odor/scum reduction; DO gain +0.3-0.4 mg/L post-harvest |
| Volume estimation | Visual area heuristics; coarse | Fluorescence LiDAR intensity-range model | Volume RMSE ≤12%, bias <5% |
| Sun/glitter robustness | Camera glare; mid-day dropouts | Band-pass 650-750 nm + temporal gating | Mid-day valid returns ≥85-90% of dawn |
| Salinity adaptation | Fixed thresholds | V_thr = f(ppt) per water type | Decision correctness ≥88% across sites |
| Multi-sensor fusion | Single sensor (camera or EC) | AI cam + LiDAR + EC-salinity | Harmful P/R ≥0.90/0.90; useful false-removal ≤0.10 |
| Path planning | Straight line; always harvest | Avoid-route around live/beneficial patches | Small path cost (deviation ≤0.7 m), ecosystem preserved |
| Energy per hectare | Wasted collection passes | Targeted harvest only when warranted | Energy ≤ +10% vs baseline with better outcomes |
| Calibration & error budget | Not specified | LiDAR timing ≤10 ns; PSS-78 EC→ppt; camera HDR | Repeatable, auditable performance |
| Data & audit | Sparse logs | CSV logs: ppt, $\hat{V}$, decay feats, class, decision | FER (Federal Regulation)/inspection-ready traceability |
| Maintenance (salinity) | Contacting EC cell fouls | Toroidal/inductive EC probe | Lower drift (+0.03 ppt/week), less cleaning |
| Safety & failsafes | Manual stop only | E-stop, bin-full, jam interlocks | Fewer incidents; graceful degrade (default-safe avoid) |
| Marine readiness | Mixed IP ratings | IP67 LiDAR; IP68 probe; IP65-67 enclosures | Higher uptime in spray/chop |
| Upgradability | Fixed | GbE, RS-485, CAN-FD; OTA | Easy sensor/model swaps |

In one embodiment herein, Table 19 depicts the components of the AI-based autonomous system 100, the suggested materials for each component, and the reasons supporting the selection of those materials.

TABLE 19

| Component | Suggested Material | Reason for Selection |
|---|---|---|
| Floating body | High-Density Polyethylene (HDPE)/Marine-Grade Aluminum | Lightweight, corrosion-resistant, buoyant, and durable. |
| Propelling Wheels | Rubber-Coated Stainless Steel | Provides grip on water surfaces, corrosion-resistant, and durable. |
| First & Second Roller | Stainless Steel (SS 304) | Corrosion-resistant, strong, and ensures smooth belt movement. |
| Inclined conveyor belt | Polyurethane (PU)/PVC | Water-resistant, durable, and flexible for efficient waste collection. |
| Container | Fiberglass-Reinforced Plastic (FRP) | Lightweight, corrosion-resistant, and durable for prolonged use. |
| Supporting frame | Aluminum Alloy/Stainless Steel | Strong, lightweight, and resistant to corrosion for holding AI imaging unit and sensors. |
| Water Salinity Sensor | Titanium/PVC Housing | Corrosion-resistant, non-reactive to water, and durable. |
| Controller Housing | Aluminum Enclosure (IP67-rated) | Waterproof, heat-resistant, and protects electronic components. |

Figure 5:
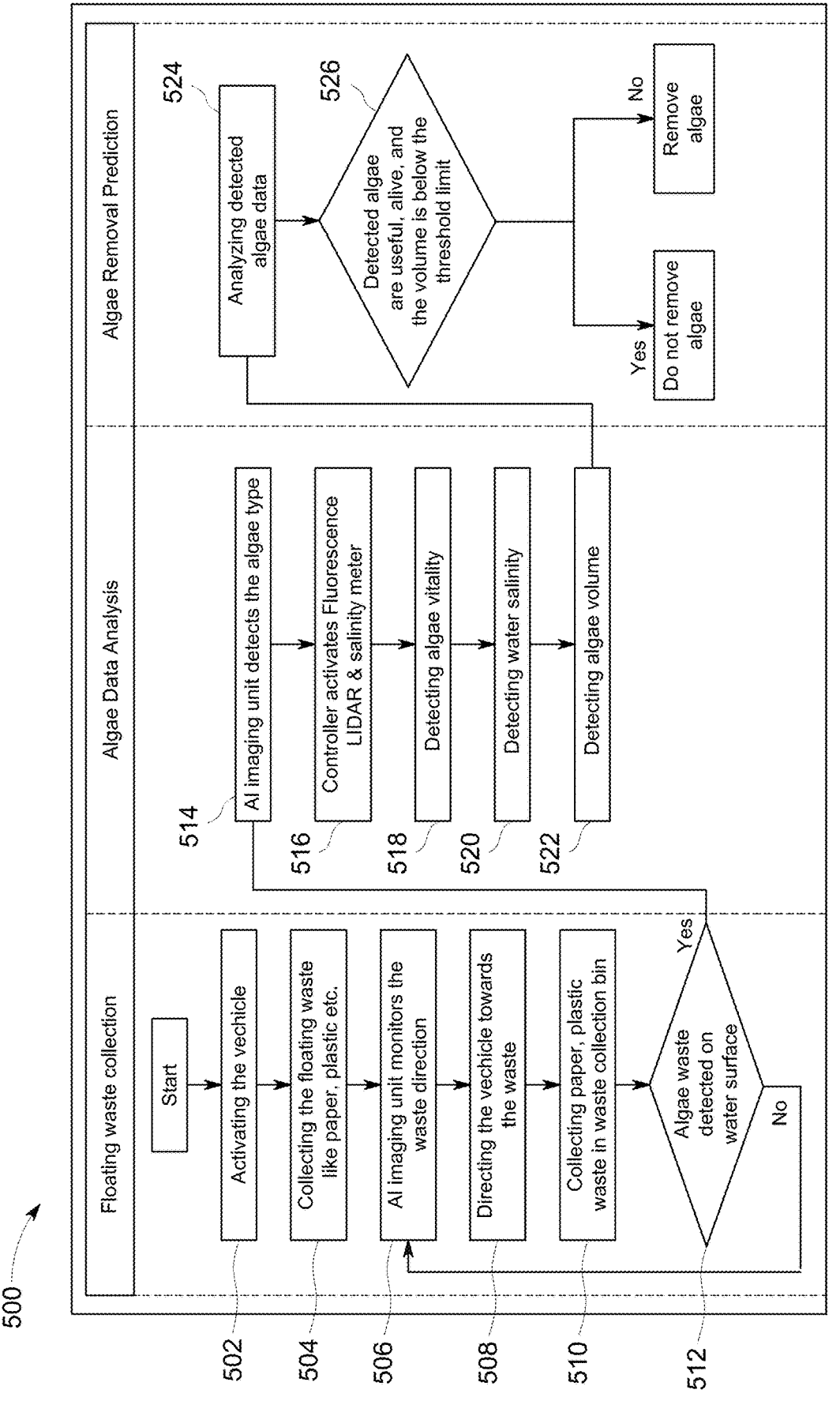
FIG. 5 illustrates a flow chart of a method for predicting and selectively removing floating waste from water bodies using the artificial intelligence (AI)-based autonomous system, in accordance with embodiments of the invention.

FIG. 5 refers to a flow chart 500 of a method for predicting and selectively removing floating waste 10 from water bodies using the AI-based autonomous system 100. The method comprises a floating waste collection phase and an organic waste analysis and removal phase. At step 502, the AI-based autonomous system 100 is activated to initiate the floating waste collection process. At step 504, the autonomous water-cleaning vehicle 128 collects the floating waste 10, such as the recyclable waste 14, which can be, but is not limited to, paper and plastic, from the water surface. At step 506, the AI imaging unit 160 detects and monitors the direction of the floating waste 10 for efficient collection. At step 508, the computing device 170 directs the autonomous water-cleaning vehicle 128 toward the detected floating waste 10 based on input from the AI imaging unit 160. At step 510, the floating waste 10 is collected and deposited into the container 158.

At step 512, the AI imaging unit 160 detects the presence of organic waste 12 on the water surface. At step 514, the controller 172 classifies the organic waste 12 into ecologically beneficial or harmful types using the AI imaging unit 160 based on the dataset of images related to the algae. At step 516, the controller 172 activates the optical fluorescence-sensing unit 164 and the water-salinity sensor 162 to analyze the organic waste 12. At step 518, the optical fluorescence-sensing unit 164 detects the vitality of the organic waste 12 based on fluorescence decay lifetime characteristics and temporal-attenuation profiles. At step 520, the water-salinity sensor 162 measures water salinity to assess environmental conditions. At step 522, the optical fluorescence-sensing unit 164, in conjunction with the controller 172, computes the volume of the organic waste 12 using fluorescence intensity, ranging data, and point-cloud reconstruction techniques.

At step 524, the controller 172 analyzes the detected organic waste data, including type, vitality, volume, and water salinity, to determine the appropriate removal action. At step 526, the controller 172 generates an organic-waste removal decision by comparing the type, vitality, and volume of the organic waste 12 with salinity-dependent ecological threshold values stored in the non-transitory memory 176. If the organic waste 12 is determined to be beneficial, alive, and below the threshold volume, the controller 172 inhibits activation of the conveyor unit 151, thereby not removing the organic waste 12. If the organic waste 12 is determined to be harmful, dead, or exceeds the threshold volume, the controller 172 activates the conveyor unit 151 to remove the organic waste 12 from the water surface.

FIG. 6 refers to a flow chart 600 of a method for predicting and selectively removing floating waste from water bodies using the artificial intelligence (AI)-based autonomous system 100. At step 602, the controller 172 receives the image data of the organic waste 12 generated by the artificial intelligence (AI) imaging unit 160, the water-salinity levels obtained from the water-salinity sensor 162, the fluorescence-decay lifetime characteristics, the temporal-attenuation profiles, and the ranging data of the organic waste 12 produced by the optical fluorescence-sensing unit 164. The organic waste 12 is algae.

At step 604, the controller 172 generates a unified, time-synchronized, multi-parameter dataset by performing normalization and synchronization of the image data, the water-salinity levels, and the fluorescence-decay lifetime characteristics and ranging data. At step 606, the controller 172 classifies organic waste 12 into ecologically beneficial and ecologically harmful types using the AI imaging unit 160. The AI imaging unit 160 is pre-programmed with dataset of images representing green algae (Chlorophyta), diatoms (Bacillariophyta), red algae (Rhodophyta), blue-green algae (Cyanobacteria), dinoflagellates (Dinophyta), and golden algae (Chrysophyta).

At step 608, the controller 172 determines a vitality level of the organic waste 12 based on the fluorescence-decay lifetime characteristics and the temporal-attenuation profiles using a machine learning model. The controller 172 is pre-programmed with fluorescence decay pattern data for determining algae vitality. The machine learning model can be, but is not limited to, support vector machine (SVM), k-means clustering, DBSCAN clustering, or long short-term memory (LSTM) networks. The temporal-attenuation profiles are fluorescence decay patterns with decay times between 650-1100 nanoseconds.

At step 610, the controller 172 computes the volume of the organic waste 12 using the fluorescence intensity, the ranging data, and point-cloud reconstruction techniques to generate a three-dimensional biomass model, thereby enabling structured volumetric estimation and optimized memory usage during point-cloud reconstruction. The point-cloud reconstruction techniques can be, but is not limited to, regression analysis, point cloud processing, or kalman filter model.

At step 612, the controller 172 compares the types, the vitality level, and the volume of the organic waste 12 with salinity-dependent ecological threshold values stored in the non-transitory memory 176 to generate an organic-waste removal decision using a decision model.

The dynamic ecological thresholding reduces unnecessary removal of beneficial organic waste. The decision model can be, but is not limited to, fuzzy logic and random forest classifier models. The organic-waste removal decision is generated by comparing the computed volume against salinity-dependent threshold values stored in the non-transitory memory 176.

The salinity-dependent ecological threshold values define maximum beneficial organic waste volumes of 10-30 g/m$^3$ for salinity below 0.5 ppt, 30-50 g/m$^3$ for salinity 0.5-5 ppt, 50-100 g/m$^3$ for salinity 5-18 ppt, 100-200 g/m$^3$ for salinity 18-30 ppt, 200-500 g/m$^3$ for salinity 30-35 ppt, and over 500 g/m$^3$ for salinity above 35 ppt.

At step 614, the controller 172 activates the conveyor unit 151 of the autonomous water-cleaning vehicle 128 when the removal decision indicates harmful, dead, or excessive organic waste by the decision model, and inhibits activation when the organic waste 12 is determined to be beneficial and below threshold levels, thereby reducing mechanical load and decreasing energy consumption.

At step 616, the controller 172 commands a navigation unit 168 to maneuver the autonomous water-cleaning vehicle 128 toward or away from detected organic-waste regions based on the removal decision, thereby increasing propulsion efficiency and reducing energy consumption through optimized path-planning. At step 618, the computing device 170 enables selective activation of the conveyor unit 151 to remove the harmful or excessive organic waste 12 as determined by the organic-waste removal decision from the water surface, thereby producing a tangible modification to the water body.

In some embodiments herein, the machine learning models employed for the AI-based autonomous system 100 are referenced herein, including but not limited to, Support Vector Machine (SVM), K-Means and DBSCAN clustering, Long Short-Term Memory (LSTM) networks, Fuzzy Inference Systems, and Random Forest classifiers, are implemented using established computational frameworks (for example, TensorFlow, PyTorch, scikit-learn) executed on the disclosed controller (for example, NVIDIA Jetson Orin Nano). Training of these machine learning models utilizes labeled datasets comprising paired the multi-parameter dataset and ground-truth ecological outcomes. For classification tasks (for example, beneficial vs. harmful algae), the AI imaging unit dataset (shown in Table 12) is expanded via public ecological image repositories such as the NOAA Harmful Algal Bloom (HAB) archive and the AlgaeBase taxonomic database, applying standard augmentation techniques (rotation, scaling, lighting variation) to improve model robustness. For vitality determination, fluorescence decay patterns (Table 14) are used as time-series inputs to LSTM networks or as feature vectors for SVM classifiers, where the models are trained to correlate specific decay lifetimes (for example, 650-1100 ns for live algae) with vitality states confirmed via laboratory microscopy. The fuzzy logic and Random Forest decision models integrate these classification outputs with continuous variables (salinity, estimated volume) by applying predefined rule sets (for example, IF algae_type=harmful AND volume>threshold AND vitality=low THEN remove=YES) and trained ensemble trees on historical water-quality data. The resulting models are optimized for edge deployment, employing quantization and pruning to operate within the non-transitory memory 176 and processing constraints of the embedded controller while maintaining inference accuracy above predetermined thresholds (for example, >90% precision for harmful algae identification). Any listed machine-learning model is suitable as long as it achieves classification performance above accuracy, as described in the examples.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. An artificial intelligence (AI)-based autonomous system for predicting and selectively removing floating waste from water bodies, comprising:

a computing device having a controller and a non-transitory memory for storing instructions that are executable by the controller, wherein the computing device is disposed on a floating body of an autonomous water-cleaning vehicle, and is configured to automatically maneuver the autonomous water-cleaning vehicle across a water surface for performing a cleaning operation to collect the floating waste that includes algae and recyclable waste, wherein the computing device is configured to execute a selective cleaning operation by monitoring and analyzing types of the floating waste and parameters of the algae, wherein the parameters include type, volume, and vitality of the algae, and wherein the selective cleaning operation enables retention of ecologically beneficial algae and facilitates removal of harmful or excessive algae from the water surface that negatively impacts water quality, wherein the controller is configured to:

receive image data generated by an artificial intelligence (AI) imaging unit, water-salinity levels obtained from a water-salinity sensor, fluorescence-decay lifetime characteristics, temporal-attenuation profiles, and ranging data of the algae produced by an optical fluorescence-sensing unit, wherein the AI imaging unit and the optical fluorescence-sensing unit are configured to be disposed on a support frame affixed to the floating body, and wherein the water-salinity sensor is affixed to a front-bottom region of the floating body to enable submerged environmental sampling;

generate a unified, time-synchronized, multi-parameter dataset by performing normalization and synchronization of the image data, the water-salinity levels, and the fluorescence-decay lifetime characteristics and the ranging data, thereby producing a reduced-dimensional computational representation that eliminates redundant data and compresses salient feature vectors into a compact form suitable for real-time inference and control execution on the controller, wherein the normalization and synchronization of the image data, the water-salinity levels, and the fluorescence-decay lifetime characteristics and the ranging data reduces inference latency and improves selective-removal accuracy;

classify the algae into the ecologically beneficial and ecologically harmful types using the AI imaging unit, wherein the AI imaging unit is pre-programmed with a dataset of images representing the algae as the ecologically beneficial and ecologically harmful types, enabling precise identification and classification of the algae on the water surface;

determine a vitality level of the algae by analyzing the fluorescence-decay lifetime characteristics and the temporal-attenuation profiles using a machine learning model, wherein the controller is pre-programmed with fluorescence decay pattern data for determining algae vitality;

compute the volume of the algae using fluorescence intensity, the ranging data, and data processing techniques to generate a three-dimensional biomass model, thereby enabling structured volumetric estimation and optimized memory usage during point-cloud reconstruction;

compare the types, the vitality level, and the volume of the algae with salinity-dependent ecological threshold values stored in the non-transitory memory to generate a removal decision using a decision model, wherein dynamic ecological thresholding reduces unnecessary removal of beneficial algae, and improves selective-removal accuracy compared to fixed-threshold systems;

activate a conveyor unit of the autonomous water-cleaning vehicle when the removal decision indicates harmful, dead, or excessive algae by the decision model, and inhibit activation when the algae is determined to be beneficial and below threshold levels, thereby reducing mechanical load and decreasing energy consumption; and command a navigation unit to maneuver the autonomous water-cleaning vehicle toward or away from detected algae regions based on the removal decision, thereby increasing propulsion efficiency and reducing energy consumption through optimized path-planning, wherein the computing device is configured to selectively activate the conveyor unit to remove the harmful or excessive algae as determined by the removal decision from the water surface, thereby producing a tangible modification to the water body.

2. The AI-based autonomous system of claim 1, wherein the AI imaging unit is rotatable through 360 degrees, and wherein the AI imaging unit comprises a waterproof and corrosion-resistant enclosure configured for outdoor aquatic operation.

3. The AI-based autonomous system of claim 1, wherein the dataset of images comprises images of green algae, diatoms, red algae, blue-green algae, dinoflagellates, and golden algae.

4. The AI-based autonomous system of claim 1, wherein the optical fluorescence-sensing unit comprises a laser source emitting at 450-532 nanometers, a beam steering unit, a fluorescence detector, a spectral filter, and a timing and ranging module.

5. The AI-based autonomous system of claim 1, wherein the water-salinity sensor is a toroidal conductivity salinity meter partially immersed in water, and wherein the controller is an NVIDIA Jetson Orin Nano 8 GB module disposed within the floating body.

6. The AI-based autonomous system of claim 1, wherein the machine learning model comprises at least one of support vector machine (SVM), k-means clustering, DBSCAN clustering, or long short-term memory (LSTM) networks.

7. The AI-based autonomous system of claim 1, wherein the data processing techniques comprise at least one of regression analysis, point cloud processing, and kalman filter model.

8. The AI-based autonomous system of claim 1, wherein the decision model comprises at least one of a fuzzy logic model and a random forest classifier model.

9. The AI-based autonomous system of claim 1, wherein the temporal-attenuation profiles are fluorescence decay patterns with decay times between 650-1100 nanoseconds for live algae and under 500 nanoseconds for dead algae.

10. The AI-based autonomous system of claim 1, wherein the point-cloud reconstruction techniques utilize fluorescence intensity and LiDAR ranging data to generate three-dimensional biomass estimates.

11. The AI-based autonomous system of claim 1, wherein the removal decision is generated by comparing the computed volume of the algae against salinity-dependent threshold values stored in the non-transitory memory.

12. The AI-based autonomous system of claim 1, wherein the navigation unit comprises a global positioning system (GPS) and a global navigation satellite system (GNSS) for real-time geolocation tracking, an inertial measurement unit (IMU) with accelerometers and gyroscopes for precise orientation and motion control, and an obstacle detection and avoidance system that utilizes sonar, LiDAR (Light Detection and Ranging), and AI-based path-planning model.

13. The AI-based autonomous system of claim 1, wherein the computing device is configured to communicate with a user device via a network through IoT communication modules.

14. The AI-based autonomous system of claim 13, wherein the AI-based autonomous system is configured to enable a user to manually operate the autonomous water-cleaning vehicle through the user device via a multi-platform application.

15. The AI-based autonomous system of claim 1, wherein the salinity-dependent ecological threshold values define maximum beneficial algae volumes of 10-30 $g/m^3$ for salinity below 0.5 ppt, 30-50 $g/m^3$ for salinity 0.5-5 ppt, 50-100 $g/m^3$ for salinity 5-18 ppt, 100-200 $g/m^3$ for salinity 18-30 ppt, 200-500 $g/m^3$ for salinity 30-35 ppt, and over 500 $g/m^3$ for salinity above 35 ppt.

* * * * *